(12) United States Patent
Yoshiyama

(10) Patent No.: US 8,930,802 B2
(45) Date of Patent: Jan. 6, 2015

(54) RECEIVING APPARATUS AND METHOD THAT DETECT RECEPTION OF SERIAL DATA HAVING A PLURALITY OF BLOCKS

(75) Inventor: Masayuki Yoshiyama, Chiba (JP)

(73) Assignee: MegaChips Corporation, Osaka-shi (JP)

( * ) Notice: Subject to any disclaimer, the term of this patent is extended or adjusted under 35 U.S.C. 154(b) by 302 days.

(21) Appl. No.: 13/493,187

(22) Filed: Jun. 11, 2012

(65) Prior Publication Data

US 2012/0317464 A1    Dec. 13, 2012

(30) Foreign Application Priority Data

Jun. 9, 2011    (JP) .................................. 2011-129071

(51) Int. Cl.
*H03M 13/49*    (2006.01)
*H04L 7/04*    (2006.01)
*H03M 13/53*    (2006.01)

(52) U.S. Cl.
CPC ..................................... *H04L 7/042* (2013.01)
USPC .......................................... 714/799; 714/712

(58) Field of Classification Search
CPC ... G06F 11/10; G06F 11/1008; G06F 11/221; H04L 1/0061; H04L 43/50; H04L 12/2697; H04L 1/242
See application file for complete search history.

(56) References Cited

U.S. PATENT DOCUMENTS 7,463,171 B2 *   12/2008  Baba ............................. 341/100
2005/0169414 A1 *  8/2005  Kumata ........................ 375/354

FOREIGN PATENT DOCUMENTS

| JP | A-7-202865 | 8/1995 |
| JP | A-8-65294 | 3/1996 |
| JP | A-2005-260500 | 9/2005 |

* cited by examiner

*Primary Examiner* — Ajay Bhatia
*Assistant Examiner* — Dipakkumar Gandhi
(74) *Attorney, Agent, or Firm* — Oblon, Spivak, McClelland, Maier & Neustadt, L.L.P.

(57) ABSTRACT

Exemplary receiving apparatus receives serial data that includes contiguous blocks each having M-bit known pattern. The apparatus includes a serial-parallel conversion circuit that arranges bits in the serial data to generates N-bit wide (N<M) parallel data, a register group including a first register that stores a word of the parallel data and second registers to which the word of the parallel data is sequentially shifted and stored, a comparing circuit that compares the known pattern with storage patterns each including M contiguous bits stored in the register group, and a detecting circuit. The detecting circuit detects reception of the serial data if the comparing circuit detects a first match between the known pattern and a first one of the storage patterns, and a second match between the known pattern and a second one of the storage patterns that starts with a specific bit during a specific clock cycle.

34 Claims, 14 Drawing Sheets

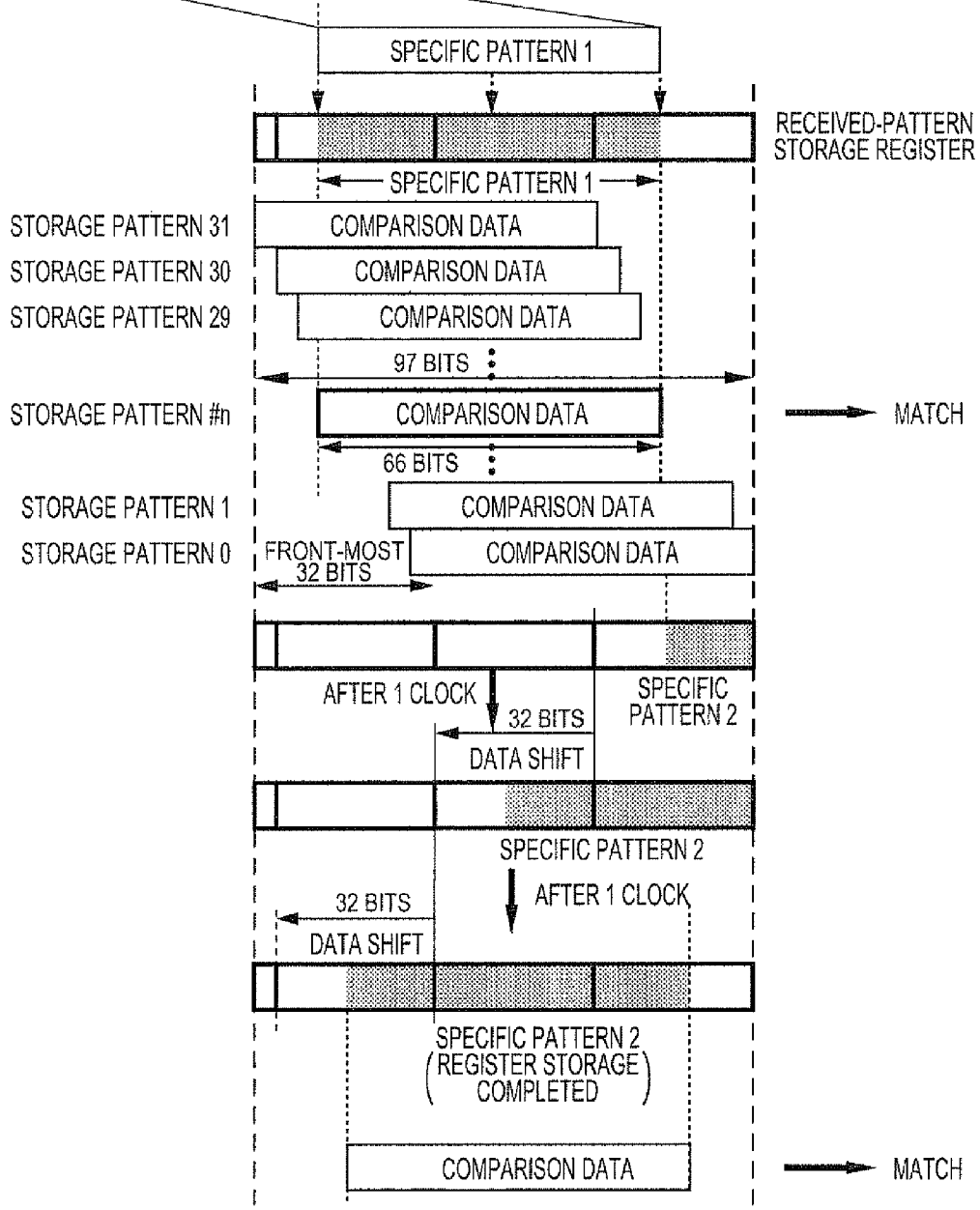

TO FIG. 6B

RECEIVING APPARATUS AND METHOD THAT DETECT RECEPTION OF SERIAL DATA HAVING A PLURALITY OF BLOCKS

BACKGROUND

This disclosure relates to a receiving apparatus that receives serial data, or serial pattern, which includes a plurality of contiguous blocks each having a known bit pattern, or a specific pattern. The receiving apparatus detects that serial data including a predetermined number of contiguous blocks each having the specific pattern is received.

Various communication protocols used in high-speed serial communication technology assume detection of specific patterns. As illustrated in FIG. 15, a typical structure of serial pattern includes a preamble, a start delimiter, a payload, and an end of burst (EOB) (or end delimiter). Each of them except for the payload, which is used for carrying data, has a specific number of bits with a specific pattern specified in the communication protocols.

Japanese Laid-open Patent Publication JP 7-202865 (Patent document 1) describes a technique in which serial data is converted to n-bit parallel data. The n-bit parallel data is received and (n+m−1)-bit parallel data is stored in a register, where m is a length of a specific pattern. By successively shifting the start bit by one bit, N data each including M contiguous bits are read from the register in which (n+m−1)-bit parallel data is stored. And matching of the N data with the m-bit specific pattern is detected in parallel by using N m-bit comparators.

Japanese Laid-open Patent Publication JP 2005-260500 (Patent document 2) and Japanese Laid-open Patent Publication JP 8-65294 (Patent document 3) each describes a technique that permits bit errors caused by, for example, disturbances during transmission. That is, each bit in parallel data is compared with a corresponding bit in a specific pattern. Even when some bits in parallel data do not match corresponding bits in the specific pattern, it is determined that the parallel data matches the specific pattern if the number of unmatched bits does not exceed a predetermined value.

Each of the preamble and the end of burst, such as those defined in the standard specification IEEE802.3av for 10G-EPON applications, is composed of a plurality of contiguous blocks. Each of the blocks has a 66-bit specific pattern.

The technique disclosed in Patent Document 1 involves detecting the specific pattern in a block. However, the technique is not intended for receiving serial data that contains a plurality of successive blocks having specific patterns.

The techniques disclosed in Patent Documents 2 and 3 may be used to determine a number of bit errors in each block. However, neither of these Patent Documents discloses a technique to determine a total number of bit errors in successive blocks.

SUMMARY

It would be advantageous to provide receiving apparatuses and methods capable of correctly detecting a reception of serial data by performing successive detections of specific patterns in contiguous blocks.

It would be further advantageous to provide receiving apparatuses and methods capable of correctly determining number of bit errors in successive blocks.

Aspects of this disclosure provide a receiving apparatus that receives serial data. The receiving apparatus includes a serial-parallel conversion circuit, a register group, a comparing circuit, and a detecting circuit. The serial-parallel conversion circuit arranges bits in the serial data in an order of receiving to generate N-bit wide parallel data. The register group includes a first register that stores a word of the N-bit wide parallel data and one or more second registers to which the word of the parallel data stored in the first register is sequentially shifted and stored in synchronization with a parallel clock. The comparing circuit compares an M-bit known pattern with M-bit storage patterns each including M contiguous bits stored in the register group in the order of receiving, where N<M. The serial data includes a plurality of contiguous blocks each having the M-bit known pattern. The detecting circuit detects that the receiving apparatus has received the serial data if (i) the comparing circuit detects, during a first cycle of the parallel clock, a first match between the known pattern and a first one of the storage patterns that starts with K-th bit from a front side of a specific range of bits, which includes N contiguous bits stored in the register group in the order of receiving, where K=0 to N−1, and (ii) the comparing circuit further detects, during a specific cycle of the parallel clock determined by K, N, Q, and R, where Q is a quotient of M/N and R is a remainder of M/N, a second match between the known pattern and a second one of the storage patterns that starts with a specific bit determined by the specific range of bits and K, N, and R.

In an example, the comparing circuit compares the known pattern with only the second one of the storage patterns during the specific cycle. In another example, the comparing circuit stops comparing during one or more cycles of the parallel clock after the first cycle and before the specific cycle.

According to an aspect of this disclosure, the comparing circuit compares the known pattern with the storage patterns to determine numbers of unmatched bits in respective ones of the storage patterns, and the comparing circuit further includes (i) a first unmatched-bit-number register to store the numbers of unmatched bits in the respective ones of the storage patterns, and (ii) a second unmatched-bit-number register having at least one stage to which the numbers of unmatched bits stored in the first unmatched-bit-number register are shifted and stored in synchronization of the parallel clock.

In an embodiment, the comparing circuit detects the first and the second match if a sum of i) the number of unmatched bits in the first one of the storage patterns during the first cycle of the parallel clock stored in the second unmatched-bit-number register and ii) the number of unmatched bits in the second one of the storage patterns during the specific cycle of the parallel clock stored in the first unmatched-bit-number register is less than an allowable number of bit errors.

In another embodiment, when the comparing circuit detects, during the first cycle of the parallel clock, a multiple first match between the known pattern and two or more of the storage patterns that start with respective ones of bits within the specific range of bits, the comparing circuit selects one of the two or more of the storage patterns as the first one of the storage patterns according to a predetermined rule.

According to an aspect of this disclosure, the comparing circuit outputs comparison results for respective ones of the storage patterns, and the detecting circuit includes a selecting circuit that selects respective ones of the comparison results between the know pattern and the second one of the storage patterns from the comparison results output from the comparing circuit so that the detecting circuit determines that the comparing circuit detects the second match based on the selected ones of the comparison results.

In an embodiment, the detecting circuit further includes a masking circuit so that the detecting circuit determines that the comparing circuit detects the second match based on the selected ones of the comparison results after the masking circuit masks a portion of the comparison results that represent matches between the known pattern and the second one of the storage patterns during one or more cycles of the parallel clock after the first cycle and before the specific cycle.

According to an aspect of this disclosure, the detecting circuit detects that the receiving apparatus has received the serial data if (i) the comparing circuit detects a first match between the known pattern and a first one of the storage patterns that starts with K-th bit from a front side of a specific range of bits, which includes N contiguous bits stored in the register group in the order of receiving, where K=0 to N−1, during a first cycle of the parallel clock, and (ii) the comparing circuit further detects a second match (1A) between the known pattern and a second one of the storage patterns that starts with (K+R)-th bit from the front side of the specific range of bits during Q-th cycle after the first cycle of the parallel clock, where Q is a quotient of M/N and R is a remainder of M/N, when K<N−R, and (2A) between the known pattern and a second one of the storage patterns that starts with (K+R−N)-th bit from the front side of the specific range of bits during (Q+1)-th cycle after the first cycle of the parallel clock when N−R≤K.

In an embodiment, the comparing circuit includes N comparators that compare the known pattern with the storage patterns that start with respective ones of the bits within the specific range of bits. (1A) the detecting circuit detects that the receiving apparatus has received the serial data if one of the comparators that compares the known pattern with one of the storage patterns that starts with (K+R)-th bit from the front side of the specific range of bits detects the second match during Q-th cycle after the first cycle of the parallel clock when K<N−R, and (2A) the detecting circuit detects that the receiving apparatus has received the serial data if one of the comparators that compares the known pattern with one of the storage patterns that starts with (K+R−N)-th bit from the front side of the specific range of bits detects the second match during Q+1)-th cycle after the first cycle of the parallel clock when N−R≤K.

According to another aspect of this disclosure, the detecting circuit detects that the receiving apparatus has received the serial data if the comparing circuit detects, during a first cycle of the parallel clock, a first match between the known pattern and a first one of the storage patterns that starts with K-th bit from a front side of a specific range of bits, which includes N contiguous bits stored in the register group in the order of receiving, where K=0 to N−1, and the comparing circuit further detects, during a specific cycle of one of Q-th cycle after the first cycle and (Q+1)-th cycle after the first cycle of the parallel clock, where Q is a quotient of M/N, a second match between the known pattern and a second one of the storage patterns that starts with a specific bit. When the specific cycle is Q-th cycle after the first cycle of the parallel clock, the specific bit is (1A) (K+R)-th bit from the front side of the specific range of bits, where R is a remainder of M/N, when K<N−R, and (2B) (K+R−N)-th bit from a front side of a second specific range of bits, which includes R contiguous bits stored in the register group in the order of receiving immediately after the specific range of bits, when N−R≤K. When the specific cycle is (Q+1)-th cycle after the first cycle of the parallel clock, the specific bit is (1B) K-th bit from a front side of a third specific range of bits, which includes N−R contiguous bits stored in the register group in the order of receiving immediately before the specific range of bits, when K<N−R, and (2A) (K+R−N)-th bit from the front side of the specific range of bits when N−R≤K.

In an embodiment, the specific cycle is Q-th cycle after the first cycle of the parallel clock, and the comparing circuit includes (i) N first comparators that compare the known pattern with the storage patterns that start with respective ones of the bits within the specific range of bits, and (ii) R second comparators that compare the known pattern with the storage patterns that start with respective ones of the bits within the second specific range of bits. The detecting circuit detects that the receiving apparatus has received the serial data if (1A) one of the N first comparators that compares the known pattern with one of the storage patterns that starts with (K+R)-th bit from the front side of the specified range of bits detects the second match during the specific cycle when K<N−R, and (2B) one of the second comparators that compares the known pattern with one of the storage patterns that starts with (K+R−N)-th bit from the front side of the second specific range of bits detects the second match during the specific cycle when N−R≤K.

In another embodiment, the specific cycle is (Q+1)-th cycle after the first cycle of the parallel clock, and the comparing circuit includes (i) N first comparators that compare the known pattern with the storage patterns that start with respective ones of the bits within the specific range of bits, and (ii) N−R third comparators that compare the known pattern with the storage patterns that start with respective ones of the bits within the third specific range of bit. The detecting circuit detects that the receiving apparatus has received the serial data if (1B) one of the third comparators that compares the known pattern with one of the storage patterns that starts with K-th bit from the front side of the third specific range of bits detects the second match during the specific cycle when K<N−R, and (2A) one of the first comparators that compares the known pattern with one of the storage patterns that starts with (K+R−N)-th bit from the front side of the specific range of bits detects the second match during the specific cycle when N−R≤K.

Aspects of this disclosure provide a method of detecting reception of serial data that includes a plurality of contiguous blocks each having M-bit known pattern. The method includes arranging bits in the serial data in an order of receiving to generate N-bit wide parallel data, storing a word of the N-bit wide parallel data in a first register of a register group, sequentially shifting and storing the word stored in the first register into one or more second registers of the register group in synchronization with a parallel clock, and comparing the M-bit known pattern with M-bit storage patterns each including M contiguous bits stored in the register group in the order of receiving, where N<M. The method further includes detecting the reception of the serial data if (i) the comparing detects, during a first cycle of the parallel clock, a first match between the known pattern and a first one of the storage patterns that starts with K-th bit from a front side of a specific range of bits, which includes N contiguous bits stored in the register group in the order of receiving, where K=0 to N−1, and (ii) the comparing further detects, during a specific cycle of the parallel clock determined by K, N, Q, and R, where Q is a quotient of M/N and R is a remainder of M/N, a second match between the known pattern and a second one of the storage patterns that starts with a specific bit determined by the specific range of bits and K, N, and R.

BRIEF DESCRIPTION OF THE DRAWINGS

Various embodiments of this disclosure that are proposed as examples will be described in detail with reference to the following figures, wherein like numerals reference like elements, and wherein:

FIG. 4 conceptually illustrates how parallel data is stored in the received-pattern storage register;

DETAILED DESCRIPTION OF EMBODIMENTS

Figure 1:
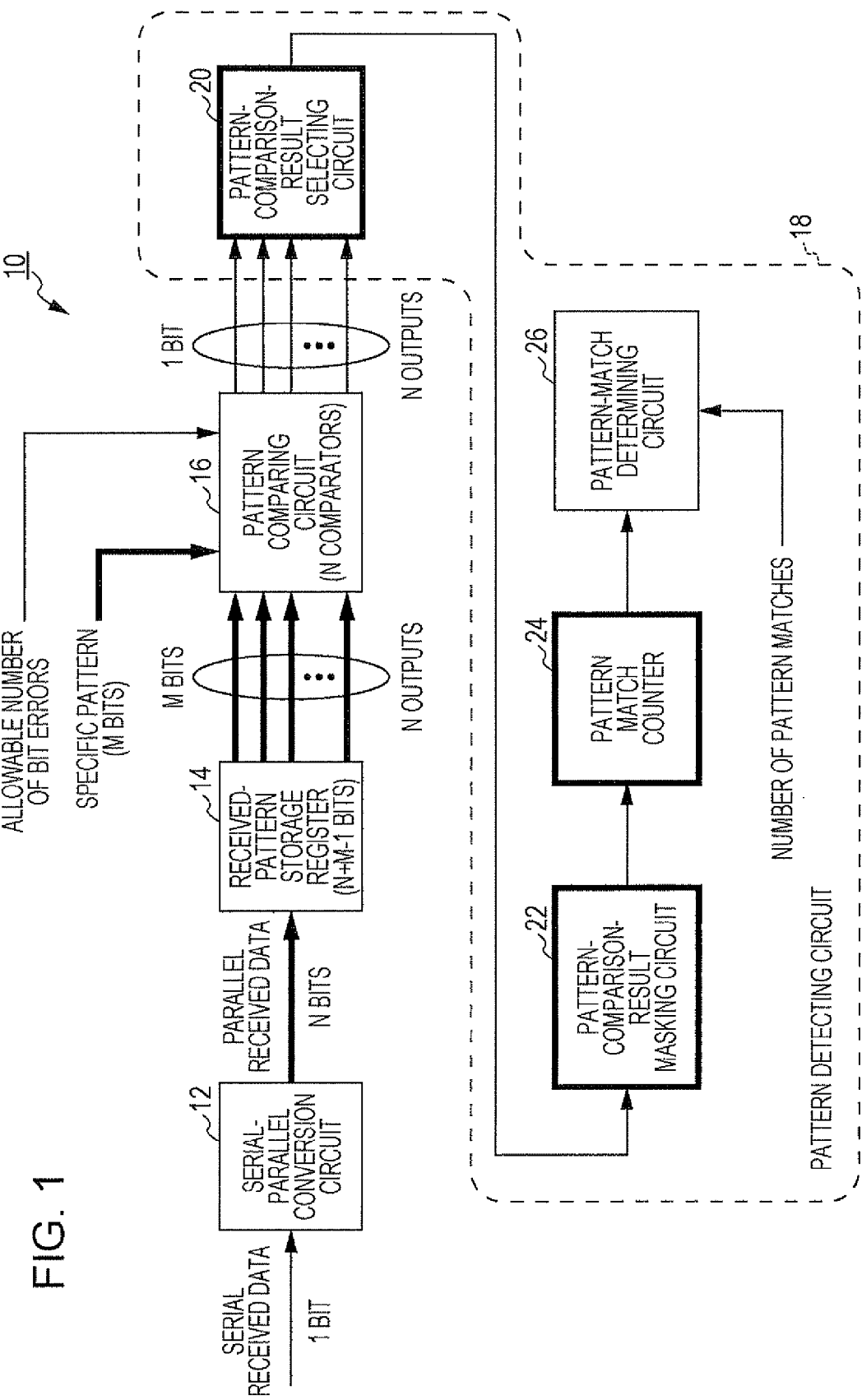
FIG. 1 shows a block diagram of an exemplary receiving apparatus according to this disclosure.

FIG. 1 shows a block diagram of an exemplary receiving apparatus according to this disclosure. The receiving apparatus 10 shown in FIG. 1 receives serial data containing contiguous blocks each having an M-bit long known bit pattern, or a specific pattern. The receiving apparatus 10 detects the specific patterns in the contiguous blocks, and determines that it has received serial data if it detected the specific patterns in a predetermined number of contiguous blocks.

The receiving apparatus 10 includes a serial-parallel conversion circuit 12, a received-pattern storage register 14, a pattern comparing circuit 16, and a pattern detecting circuit 18.

Figure 15:
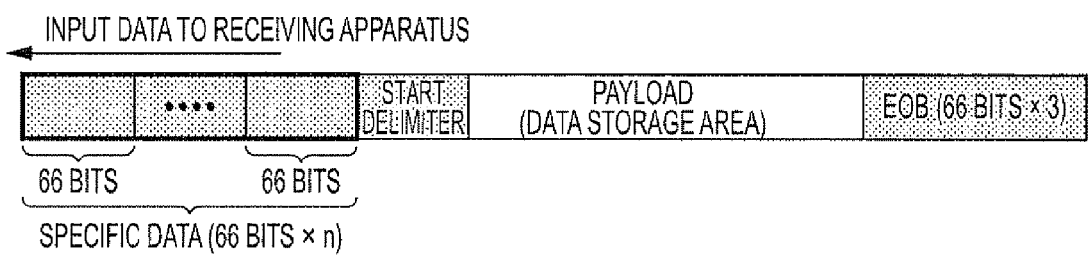
FIG. 15 shows an exemplary configuration of a serial pattern.

As shown in FIG. 15, serial data is input to the receiving apparatus 10 in the order of a preamble, a start delimiter, a payload, and an end of burst (EOB). The preamble includes a plurality of blocks of M-bit long specific patterns, which are sequentially input to the receiving apparatus 10.

The serial-parallel conversion circuit 12 arranges data of successively received bits, which constitute the serial data, in an order of receiving the bits in synchronization with a serial clock. Thereby, the serial-parallel conversion circuit 12 generates N-bit wide parallel data, where N<M. The serial-parallel conversion circuit 12 arranges the data of bits constituting the serial data in a register, which constitutes the serial-parallel conversion circuit 12, to generate the parallel data. The serial-parallel conversion circuit may arrange the data of bits in an order from the most significant bit to the least significant bit, or vice versa.

The received-pattern storage register 14 has a storage area in which words of the N-bit wide parallel data input from the serial-parallel conversion circuit 12 are stored. The received-pattern storage register 14 stores the words of the parallel data successively input from the serial-parallel conversion circuit 12 in an order of input, and sequentially shifts the words of stored parallel data in synchronization with a parallel clock.

The received-pattern storage register 14 has a storage capacity such that the latest or the last (N+M−1) bits of data constituting the received serial data are always stored. It is also possible to increase the storage capacity such that more than N+M−1 bits of data are stored.

The received-pattern storage register 14 outputs N M-bit long storage patterns, which start with respective bits within a specified range of N contiguous bits. The specified range includes N contiguous bits stored in the received-pattern storage register 14 in an order of receiving as serial data.

The received-pattern storage register 14 is constituted by a group of registers having a pipeline architecture. The group of registers includes a first register in which a word of N-bit wide parallel data generated by the serial-parallel conversion circuit 12 is stored. The group of registers further includes one or more second registers in which the parallel data stored in the first register is shifted and stored in synchronization with the parallel clock.

The pattern comparing circuit 16 includes N comparators. The pattern comparing circuit 16 compares each of N M-bit long storage patterns with a predetermined M-bit-long specific pattern, and outputs N pattern match flags as results of the comparison.

The pattern comparing circuit 16 further has a bit-error tolerance adjustment function. That is, the pattern comparing circuit 16 compares each of corresponding bits and determines a number of unmatched bits or a number of bits where the storage pattern and the specific pattern do not match as a number of bit errors.

Then, pattern comparing circuit 16 compares the number of bit errors in each of the storage patterns with a predetermined allowable number of bit errors. The pattern comparing circuit 16 may determine that a match with the specific pattern has been detected for each of the storage patterns if the number of bit errors is smaller than the allowable number of bit errors.

The pattern detecting circuit 18 detects reception of serial data containing contiguous blocks of M-bit long specific patterns based on the matches detected by the pattern comparing circuit 16. Specifically, the pattern detecting circuit 18 detects the reception of serial data if the pattern comparing circuit 16 detects matches during successive cycles of the parallel clock. That is, the pattern detecting circuit detects the reception of serial data if first and second matches during first and second cycles of the parallel clock are successively detected.

The first match during the first cycle of the parallel clock may be a match between the M-bit long specific pattern and an M-bit storage pattern that starts with K-th bit from a front side of the specific range of N contiguous bits stored in the received-pattern storage register 14, where K=0 to N−1. The second cycle may be a specific cycle of the parallel clock determined by values of K, N, Q, and R, where Q is a quotient of M/N and R is a remainder of M/N. The second match may be a match between the M-bit long specific pattern and an M-bit storage pattern that starts with a specific bit determined by the specific range of N contiguous bits and values of K, N, and R.

The receiving apparatus 10 may perform the match detection in the following manner. Firstly, in the receiving apparatus 10, the serial-parallel conversion circuit 12, which operates in synchronization with the serial clock, converts data of bits in received serial data, or serial received data, to N-bit wide parallel data, or parallel received data.

Then, the pattern comparing circuit 16 compares each of N M-bit storage patterns contained in the parallel data stored in the received-pattern storage register 14 with an M-bit long specific pattern. The comparison is made for each corresponding bits. If the number of bit errors in a predetermined number of successive blocks of storage patterns is smaller than an allowable number of bit errors, the pattern comparing circuit 16 determines that they match.

After the pattern comparing circuit 16 initially detects a match between the M-bit long specific pattern and any of the N M-bit storage patterns, the pattern comparing circuit 16 further performs the comparison. If a match or matches between the specific pattern and storage patterns that start with specific bits are detected during specific cycles for a predetermined number of times, the pattern detecting circuit 18 detects a reception of serial data containing a predetermined number of contiguous blocks each having the M-bit long specific pattern. Here, "specific cycles" and "specific bits" are logically determined by K, Q, and R.

The description will be continued with reference to the following examples where M=66 bits, N=32 bits, Q=2, R=2, and the allowable number of bit errors is 15 bits in contiguous blocks.

Figure 2:
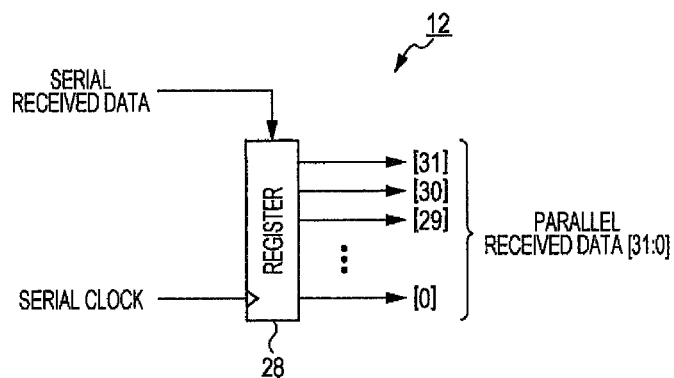
FIG. 2 shows an exemplary circuit diagram of a serial to parallel conversion circuit

As shown in FIG. 2, an exemplary serial-parallel conversion circuit 12 may be constituted with a register 28 that stores 32-bit wide parallel received data generated by the serial-parallel conversion circuit 12. The serial-parallel conversion circuit 12 shifts each bit of the serial received data from the most significant bit to the least significant bit of the register 28. Thereby, the received serial data is converted to 32-bit wide parallel received data [31:0]. In this case, bit [0] of the parallel received data is the bit at the front side of the serial received data.

Figure 3:
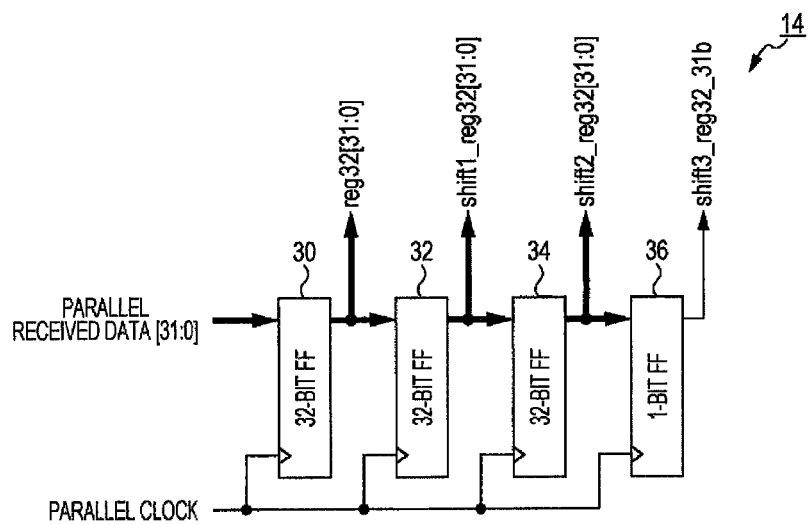
FIG. 3 shows an exemplary circuit diagram of a received-pattern storage register.

The received-pattern storage register 14 will now be described. FIG. 3 is a circuit diagram of an exemplary received-pattern storage register. The received-pattern storage register 14 shown in FIG. 3 is composed of three 32-bit flip-flops (FFs) 30, 32, and 34 and one 1-bit FF 36 connected in series.

The 32-bit wide parallel received data [31:0] input from the serial-parallel conversion circuit 12 is stored in the first-stage FF 30 in synchronization with a parallel clock. Simultaneously, the 32-bit wide parallel received data [31:0] previously stored in the upstream FFs 30, 32, and 34 is sequentially shifted to the downstream FFs 32, 34, and 36. That is, the parallel received data is shifted in an unit of 32 bits.

Then, the received-pattern storage register 14 outputs 97-bit wide parallel data by outputting output signal reg32 [0:31], output signal shift1_reg32 [0:31], output signal shift2_reg32 [0:31], and output signal shift3_reg32_31b from the FFs 30, 32, 34, and 36, respectively. The output signal shift3_reg32_31b contains data of a bit at the most front side of the received serial data. The output signal shift2_reg32 [0:31], output signal shift1_reg32 [0:31], and output signal reg32 [0:31] contain following bits of the 97-bit data.

The first-stage FF (first register) 30 is optional, and the register 28 constituting the serial-parallel conversion circuit 12 may be used as the first-stage FF 30 instead. In other words, the received-pattern storage register 14 may be composed of the register (first register) 28 constituting the serial-parallel conversion circuit 12 and the second- and subsequent-stage FFs (second registers) 32, 34, and 36. In this case, the parallel received data stored in the register 28, which constitute the serial-parallel conversion circuit 12, is sequentially shifted to the second- and subsequent-stage FFs 32, 34, and 36.

Next, how a 66-bit long specific pattern is stored in the received-pattern storage register 14 will be described. FIG. 4 conceptually illustrates how parallel data is stored in the received-pattern storage register. The leftmost bit in FIG. 4, which is output as the output signal shift3_reg32_31b, corresponds to a bit at the most front side of the serial data.

FIG. 4 shows 66-bit long storage patterns 0 to 31, or "comparison data" to be used for comparison, which are constituted by respective 66 contiguous bits stored in the received-pattern storage register 14. The storage patterns are stored in a total of 32 different positions in the received-pattern storage register 14 by shifting one bit with respect to each other.

Specifically, the storage patterns start with respective bits in a range of 32 contiguous bits, which includes 32 contiguous bits stored in the leftmost or front-most positions in the received-pattern storage register 14. Here, the 66-bit storage pattern #n starts with K-th bit (K=0 to N−1) from the front side of the range of 32 contiguous bits, where #n=31−K.

In the example shown in FIG. 4, a match between the storage pattern #n and the specific pattern 1 is detected. Then, a storage pattern for the subsequent detection of the match with the specific pattern 2 is a 66-bit long pattern following the last bit of the storage pattern #n whose match has been detected.

As described above, the 97-bit long data stored in the received-pattern storage register 14 is shifted in a unit of 32 bits in synchronization with the parallel clock. Therefore, the storage pattern following the last bit of the storage pattern #n is stored in the received-pattern storage register 14 a predetermined number of cycles after detection of the match between storage pattern #n and the specific pattern 1.

For example, in the example shown in FIG. 4, a storage pattern for the subsequent detection of the match with the specific pattern 2 is stored in the received-pattern storage register 14 two cycles after detection of the match between storage pattern #n and specific pattern 1.

FIG. 5 shows how each of even-numbered storage patterns is stored in the received-pattern storage register 14, and FIG. 6 shows how each of odd-numbered storage patterns is stored in the received-pattern storage resister 14. As shown in FIGS. 5 and 6, each storage pattern has respective portions included in three or four of the output signals reg32, shift1_reg32, shift2_reg32, and shift3_reg32_31b, which are output from the FFs 30, 32, 34, and 36, respectively, of the received-pattern storage register 14.

The output signal shift3_reg32_31b includes a bit of data at the most front side of the received serial data. This is followed in sequence by bits in output signal shift2_reg32 [0:31], output signal shift1_reg32 [0:31], and output signal reg32 [0:31].

Figure 5A:
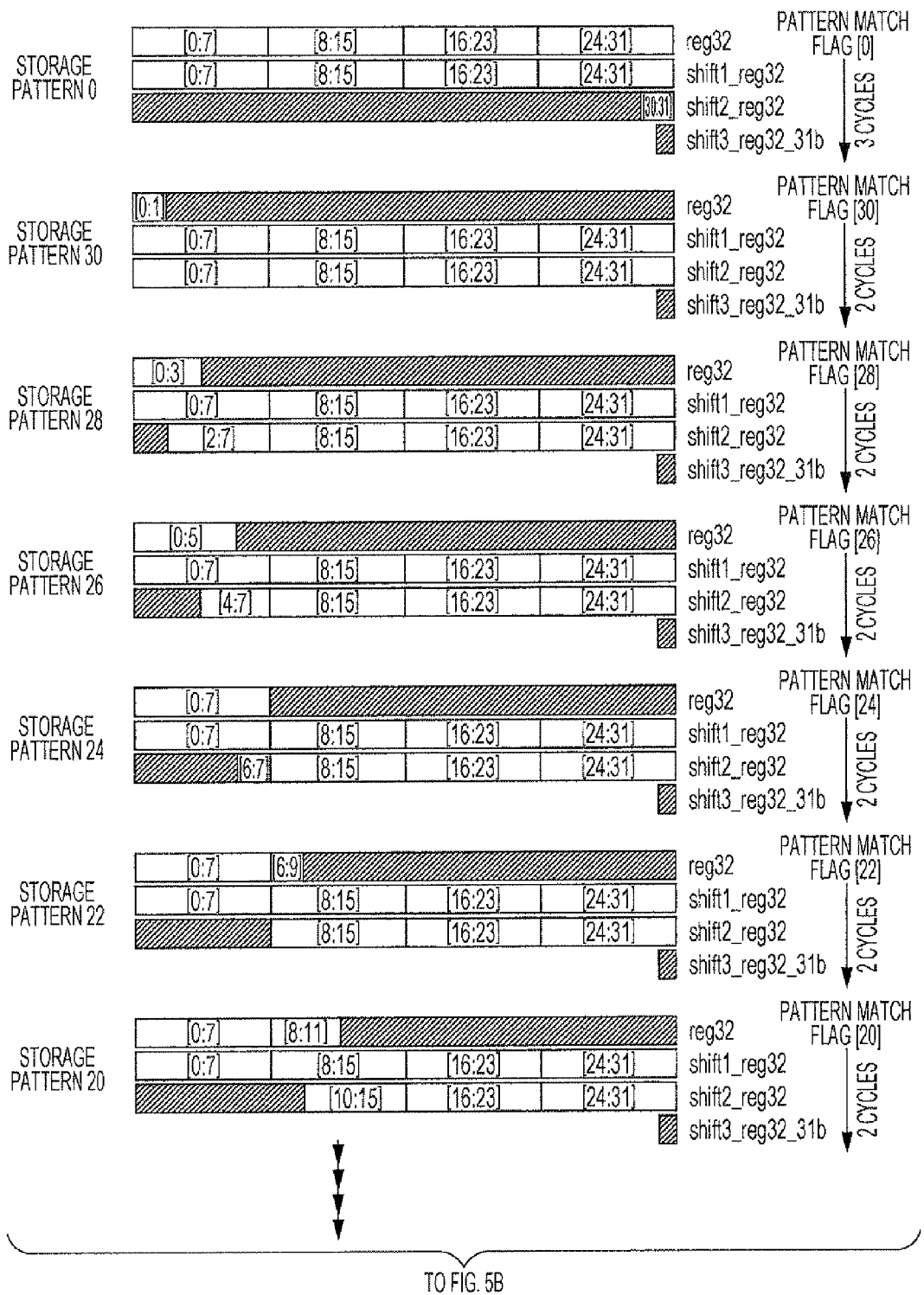
FIGS. 5A and 5B conceptually illustrate how even-numbered storage patterns are stored in the received-pattern storage register.
Figure 6A:
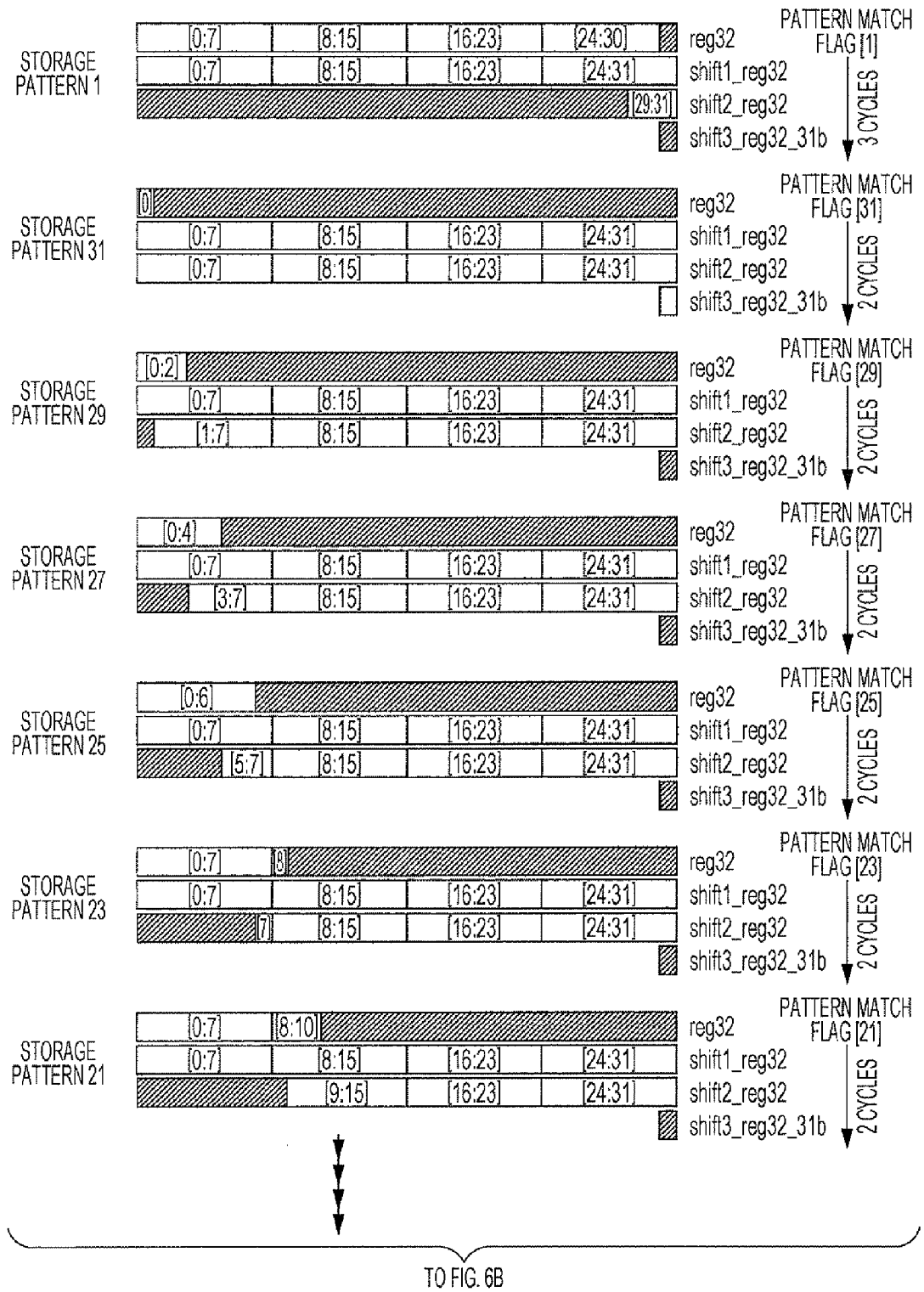
FIG. 6A and 6B conceptually illustrate how odd-numbered storage patterns are stored in the received-pattern storage register.

For example, storage pattern 0 shown in FIG. 5A is composed of 66 contiguous bits extending from output signal shift2_reg32 [30] to output signal reg32 [31]. Similarly, storage pattern 1 shown in FIG. 6A is composed of 66 contiguous bits extending from output signal shift2_reg32 [29] to output signal reg32 [30]. Storage pattern 1 is obtained by shifting the 66-bit storage pattern 0 by one bit toward the front side of the serial data.

As shown in FIG. 5A, when a match between the storage pattern 0 and the specific pattern is detected, storage pattern #n for the subsequent detection of a match with the specific pattern is the storage pattern 30, which is composed of 66 contiguous bits from the bit at the output signal shift2_reg32 [0] to the bit at the output signal reg32 [1]. The storage pattern 30 is stored in the received-pattern storage register 14 three cycles after the detection of match between the storage pattern 0 and the specific pattern. In other words, 66 contiguous bits that follow the bit at the output signal reg32 [31], which is the last bit of the storage pattern 0, are stored in the received-pattern storage register 14 and shifted to the position of the storage pattern 30 after three cycles.

As shown in FIG. 5A, when a match between the storage pattern 30 and the specific pattern is detected, storage pattern #n for the subsequent detection of a match with the specific pattern is the storage pattern 28, which is composed of 66 contiguous bits from the bit at the output signal shift2_reg32 [2] to the bit at the output signal reg32 [3]. The storage pattern 28 is stored in the received-pattern storage register 14 two cycles after the detection of the match between the storage pattern 30 and the specific pattern. In other words, 66 contiguous bits that follow the bit at the output signal reg32 [1], which is the last bit of the storage pattern 30, are stored in the received-pattern storage register 14 and shifted to the position of the storage pattern 28 after two cycles.

Figure 5B:
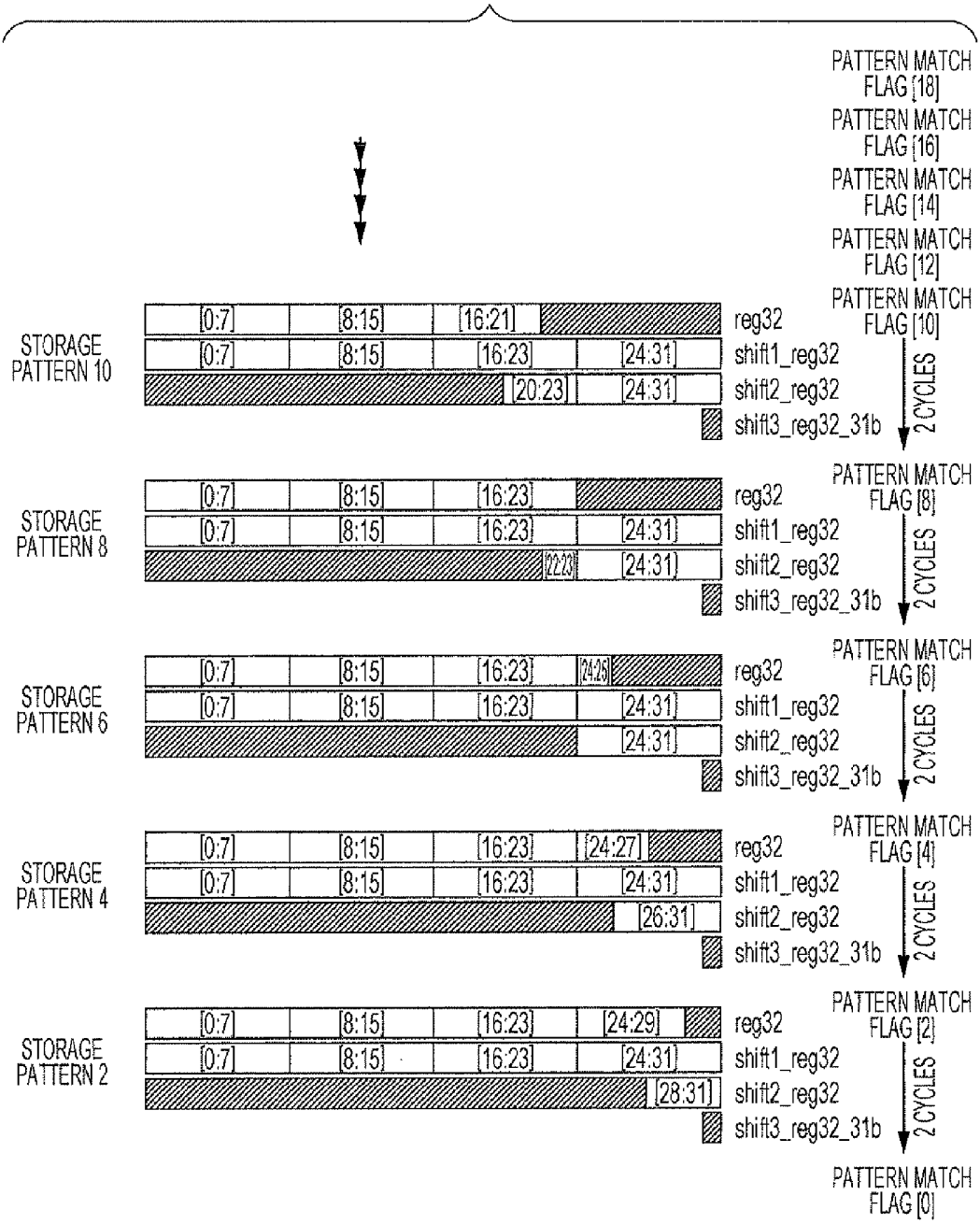

Likewise, as shown in FIGS. 5A and 5b, when a match between each of the storage patterns 28, 26, 24, . . . , 2 and the specific pattern is detected, a match between each of the storage patterns #n=26, 24, 22, . . . , 0 and the specific pattern is to be subsequently detected.

As described above, when a match between the storage pattern 0 and the specific pattern is detected, storage pattern #n to be subsequently detected is stored in the received-pattern storage register 14 three cycles after the first match. On the other hand, as shown in FIGS. 5A and 5B, when a match between any of the storage patterns 30, 28, 26, . . . , 2 and the specific pattern is detected, storage pattern #n to be subsequently detected is stored in the received-pattern storage register 14 two cycles after the first match.

Similarly, as shown in FIG. 6A, when a match between the storage pattern 1 and the specific pattern is detected, storage pattern #n for the subsequent detection of a match with the specific pattern is the storage pattern 31. The storage pattern 31 is stored in the received-pattern storage register 14 three cycles after the detection of the match between the storage pattern 1 and the specific pattern.

Figure 6B:
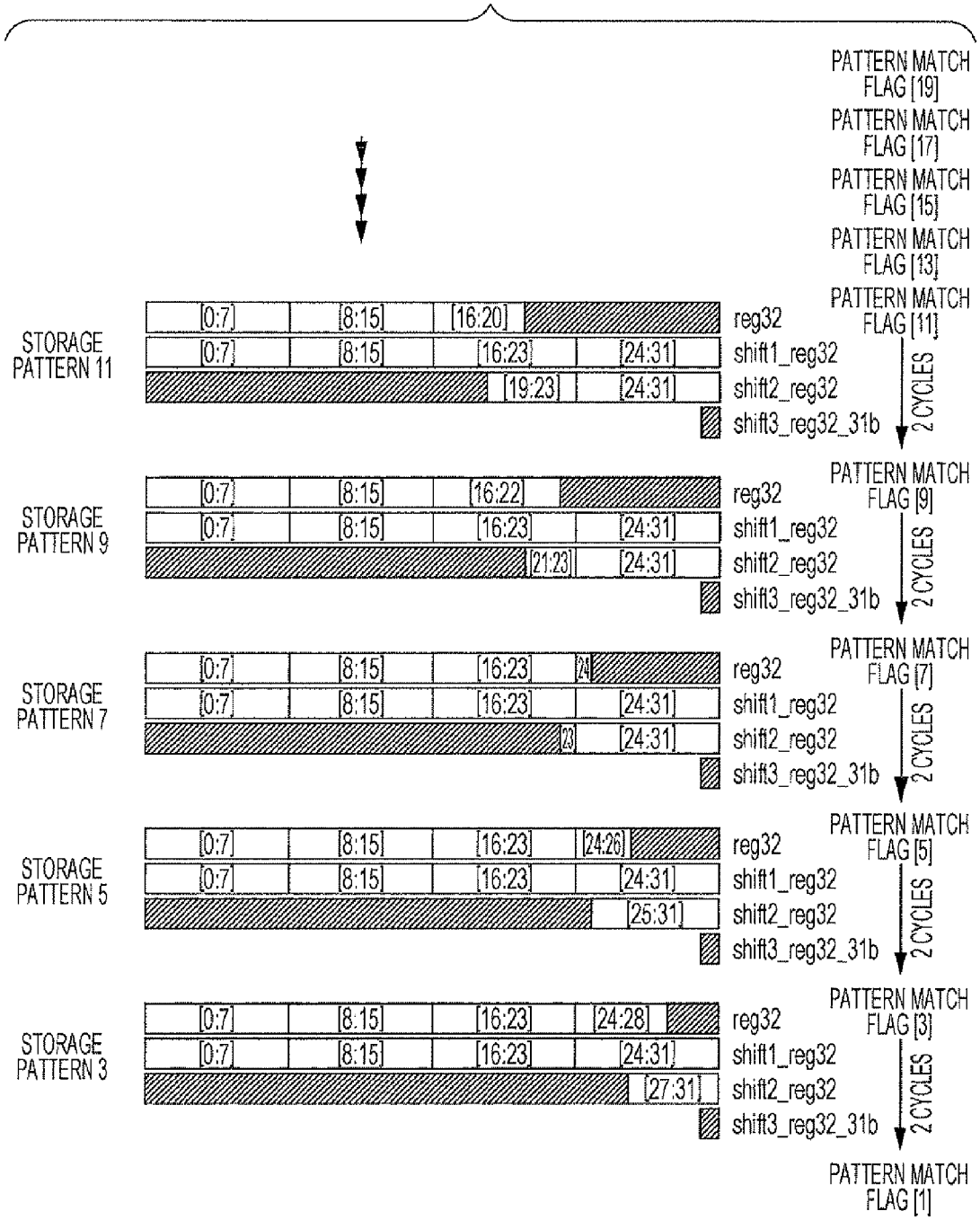

Likewise, as shown in FIGS. 6A and 6B, when a match between each of the storage patterns 31, 29, 27, . . . , 3 and the specific pattern is detected, a match between each of the storage patterns #n=29, 27, 25, . . . , 1 and the specific pattern is to be subsequently detected. Each of the storage patterns 29, 27, 25, . . . , 1 is stored in the received-pattern storage register 14 two cycles after the detection of the match between each of the storage patterns 31, 29, 27, . . . , 3 and the specific pattern.

That is, in the exemplary embodiment, when #n represents a storage pattern that matches the specific pattern, the storage pattern for a subsequent detection of a match with the specific pattern is represented by #(n−2). In the case of #(n−2)<0, however, the storage pattern for a subsequent match is represented by #(n−2+32). The number of cycles until a storage pattern for the subsequent match is stored in the received-pattern storage register 14 after detecting the first match is three in the case that the storage pattern for the first match is 0 or 1, and two in the cases that the storage pattern for the first match is one of 2 to 31.

As described above, when a match between one of the storage patterns and the specific pattern is detected, the storage pattern for the subsequent match with the specific pattern is regularly and uniquely determined by the range of N contiguous bits and the values of K, N, and R. The number of cycles until the storage pattern for the subsequent match with the specific pattern is stored in the received-pattern storage register 14 after the detection of the first match is also regularly and uniquely determined by the values of K, N, Q and R.

Figure 7:
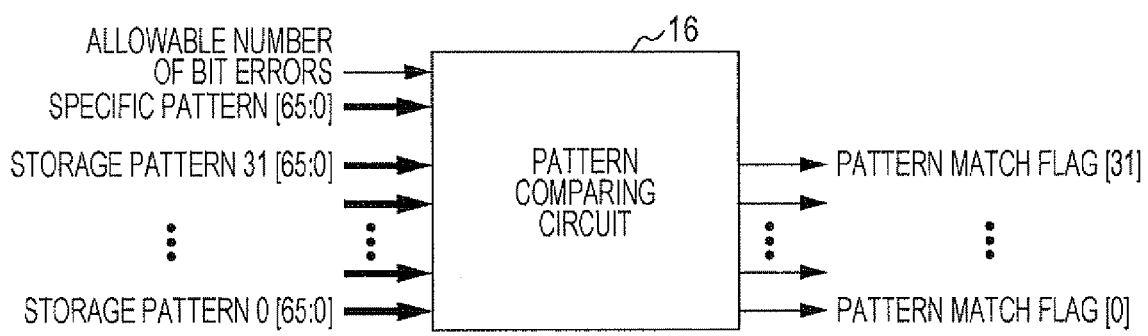
FIG. 7 shows a configuration of a pattern comparing circuit.

The pattern comparing circuit 16 will now be described. FIG. 7 shows a configuration of an exemplary pattern comparing circuit. As shown in FIG. 7, a specific pattern [65:0], an allowable number of bit errors, and 32 storage patterns #n [65:0] from the received-pattern storage register 14 are input to the pattern comparing circuit 16. The pattern comparing circuit 16 compares each of 32 storage patterns #n [65:0] with the specific pattern [65:0] and outputs pattern match flag [n] as a result of each comparison.

The comparison is performed for each corresponding bits to determine a number of bit errors. If a total number of bit errors contained in a predetermined number of contiguous blocks is smaller than the allowable number of bit errors, the pattern comparing circuit 16 detects a match with the specific pattern. In this case, the pattern comparing circuit 16 outputs a pattern match flag "1".

On the other hand, if a total number of bit errors is larger than or equal to the allowable number of bit errors, the pattern comparing circuit 16 does not detect a match, and outputs a pattern match flag "0".

Figure 8:
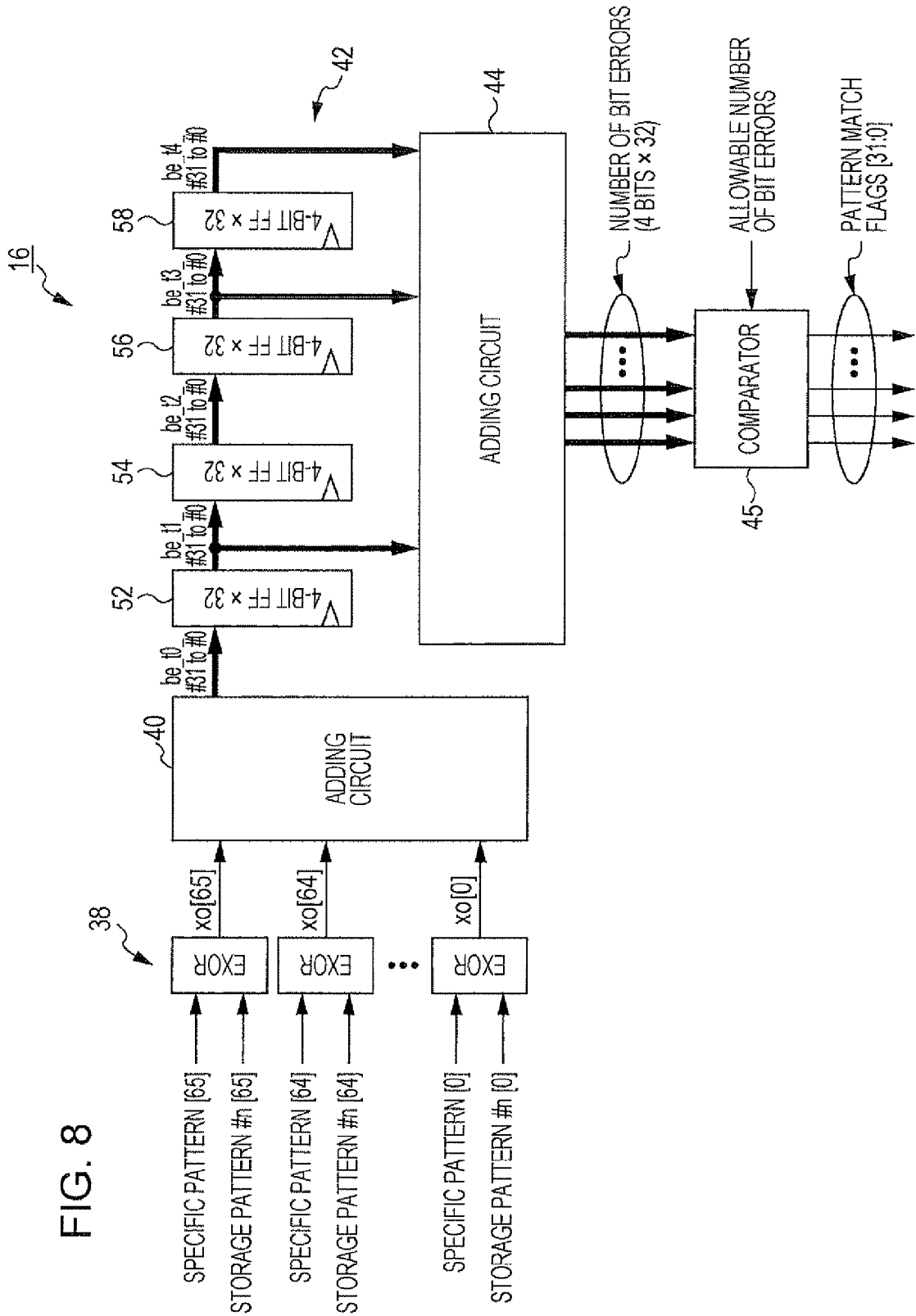
FIG. 8 shows an exemplary block diagram of a pattern comparing circuit.

FIG. 8 shows a block diagram of an exemplary pattern comparing circuit. The pattern comparing circuit 16 shown in FIG. 8 includes a pattern comparator including 66 exclusive OR (EXOR) circuits 38, a first adding circuit 40, a bit-error storage register 42, a second adding circuit 44, and a comparator 45. While not shown, there are a total of 32 pattern comparators, each including 66 EXOR circuits 38, for respective storage patterns #n.

Each EXOR circuits 38 compares corresponding bits of the storage pattern #n [65:0] and the specific pattern [65:0]. The EXOR circuits 38 output "0" or "1" as comparison results xo [65:0]. If corresponding bits of the storage pattern and the specific pattern match, the EXOR circuit 38 outputs "0". If they do not match, the EXOR circuit 38 outputs "1".

The first adding circuit 40 adds up the comparison results for the 66 bits from all the EXOR circuits 38 to calculate a number where corresponding bits of the storage pattern #n [65:0] and the specific pattern [65:0] do not match. That is, the first adding circuit 40 calculates numbers of bit errors be_t0_#31 to #0 contained in respective storage pattern #n [65:0].

When the allowable number of bit errors is 15, for example, the number of bit errors be_t0_# may have a width of 4 bits. If the number of bit errors be_t0_# is larger than 15, the first adding circuit 40 outputs "15" as the number of bit errors be_t0_#. If the number of bit errors be_t0_# is 15 or less, the first adding circuit 40 outputs the actual number of bit errors.

Figure 9:
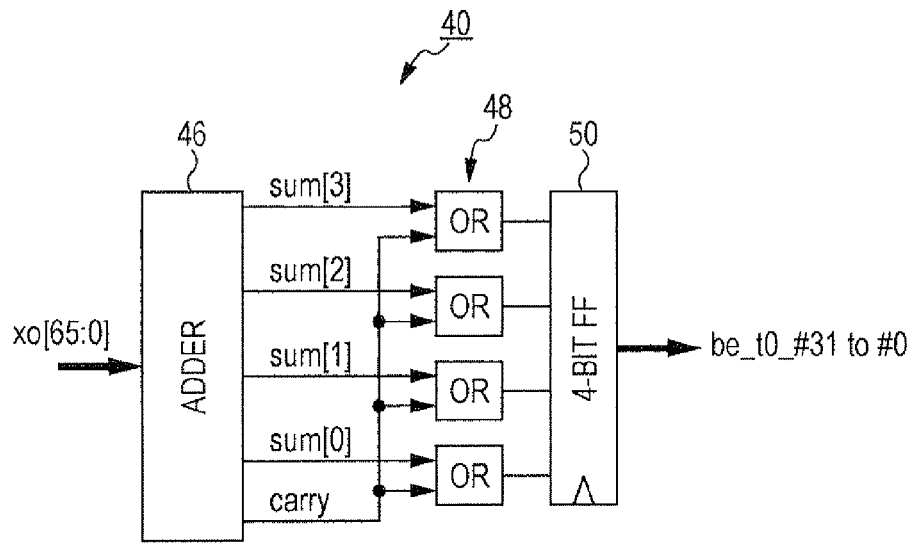
FIG. 9 shows an exemplary circuit diagram of a first adding circuit.

As shown in FIG. 9, the exemplary first adding circuit 40 includes, for example, an adder 46, four OR circuits 48, and a 4-bit FF 50 for each of the storage patterns #31 to #0. In this example, the adder 46 adds up comparison results xo [65:0] and outputs 4-bit adding result sum [3:0] indicating the number of bit errors ranging from 0 to 15. The exemplary first adding circuit 40 further outputs a 1-bit carry indicating that the number of bit errors is larger than 15, or the allowable number of bit errors.

If the carry is "1", the OR circuits 48 output "1" as 4-bit adding result sum [3:0]. Thus, the number of bit errors is fixed to "15". The output signals from the OR circuits 48 are stored in the FF 50 in synchronization with the parallel clock and output as the number of bit errors be_t0_#31 to #0.

An exemplary bit-error storage register 42 includes a first mismatch-bit-number register and a second mismatch-bit-number register having at least one stage. The first mismatch-bit-number register stores the number of bit errors be_t0_#31 to #0 received from the first adding circuit 40. The numbers stored in the first mismatch-bit-number register is sequentially shifted and stored in the second mismatch-bit-number register each time the comparison is performed.

The exemplary bit-error storage register 42 shown in FIG. 8 includes four 4-bit FFs 52, 54, 56, and 58 connected in series for each of the storage patterns #31 to #0. The first-stage FF 52 constitutes the first mismatch-bit-number register, and the remaining FFs 54, 56, and 58 constitute the second mismatch-bit-number register. In synchronization with the parallel clock, the number of bit errors be_t0_#31 to #0 input from the first adding circuit 40 is stored in the first-stage FF 52, while the numbers of bit errors stored in the upstream FFs 52, 54, and 56 are sequentially shifted to the downstream FFs 54, 56, and 58.

The output signal of the first-stage FF 52 represents the number of bit errors be_t1_#31 to #0 in the storage pattern currently stored in the received-pattern storage register 14. The output signals of the third- and the last-stage FFs 56 and 58 represent the numbers of bit errors be_t3_#31 to #0 and be_t4_#31 to #0 in the storage patterns stored in the received-pattern storage register 14 two and three cycles ago, respectively.

For storage patterns 30 and 31, the second adding circuit 44 adds the number of bit errors be_t1_#n in the current storage pattern and the number of bit errors be_t4_#(n+2) in the storage pattern stored three cycles ago. For the other storage patterns 0 to 29, the second adding circuit 44 adds the number of bit errors be_t1_#n in the current storage pattern and the number of bit errors be_t3_#(n+2) in the storage pattern stored two cycles ago.

Thus, the second adding circuit 44 calculates a total number of bit errors in two contiguous blocks. The second adding circuit 44 may also calculates a total number of bit errors in a different number of blocks. The second adding circuit 44 may constantly output a fixed value when the total number of bit errors exceeds an upper limit. In the present embodiment, the number of bit errors is fixed to 15 if it is larger than 15.

Figure 10:
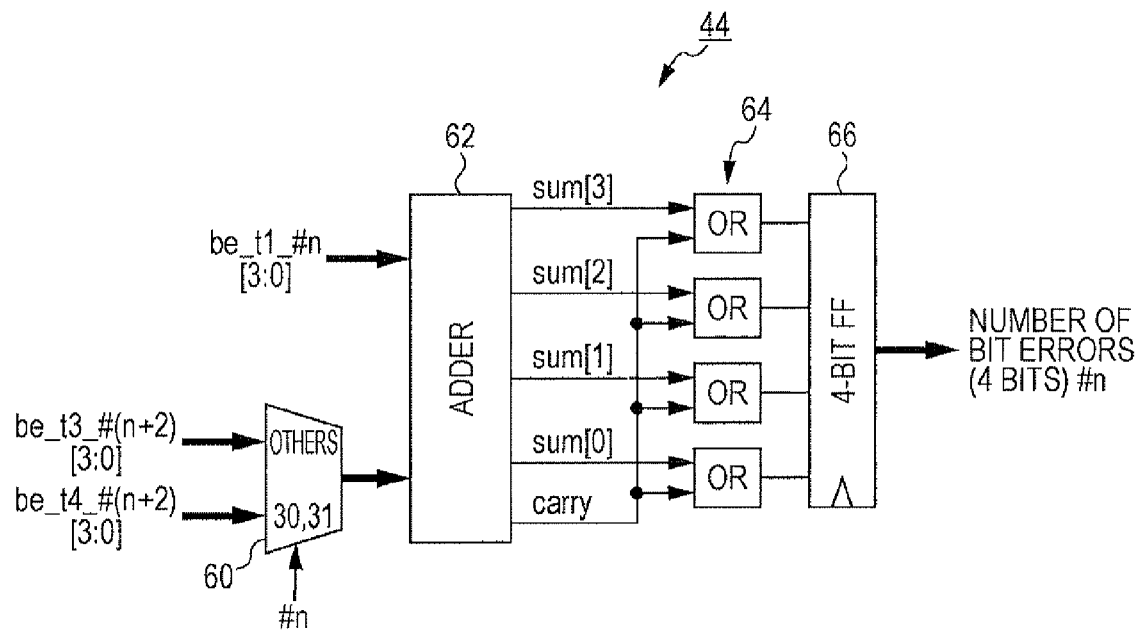
FIG. 10 shows an exemplary circuit diagram of a second adding circuit.

As shown in FIG. 10, the second adding circuit 44 includes, for example, a multiplexer 60, an adder 62, four OR circuits 64, and a 4-bit FF 66 for each of the storage patterns #31 to #0. For storage patterns 30 and 31, the multiplexer 60 outputs the number of bit errors be_t4_#(n+2) in the storage pattern stored three cycles ago. For the other storage patterns 0 to 29, the multiplexer 60 outputs the number of bit errors be t3_#(n+2) in the storage pattern stored two cycles ago.

Then, the adder 62 adds the number of bit errors be_t1_#n in the current storage pattern and the output signal of the multiplexer 60. The subsequent operations are the same as those in the first adding circuit 40. The FF 66 outputs the total number of bit errors.

For storage patterns 30 and 31, a detection of the second match means that the first match has been detected in storage patterns #(n+2)=0 and 1, respectively, three cycles ago. For storage patterns 0 to 29, a detection of the second match means that the first match has been detected in storage patterns #(n+2)=2 to 31 two cycles ago. Thus, as described above, the total number of bit errors in contiguous blocks can be correctly determined by making a determination depending on the storage pattern #n.

If the allowable number of bit errors is 15, it is meaningless to calculate the number of bit errors in a range exceeding 15. Therefore, in the example described above, if the number of bit errors exceeds 15 in the process of calculating the number of bit errors, the number of bit errors is fixed to 15. It is thus possible to reduce the circuit sizes of the first and second adding circuits 40 and 44 and the bit-error storage register 42.

The comparator 45 compares the total number of bit errors output from the second adding circuit 44 with the allowable number of bit errors and outputs a pattern match flag for each of the storage patterns. As described above, if the total number of bit errors in a predetermined number of contiguous blocks is smaller than the allowable number of bit errors, the comparator 45 determines that the contiguous blocks match the specific pattern, and outputs a pattern match flag "1". On the other hand, if the number of bit errors is larger than or equal to the allowable number of bit errors, the comparator 45 determines that they do not match, and outputs a pattern match flag "0".

The exemplary pattern comparing circuit shown in FIG. 8 having the bit-error storage register 42 and the second adding circuit may be advantageously utilized when the allowable number of bit errors is specified as a total number of bit errors in two or more successive blocks. When the allowable number of bit errors is specified as a number of bit errors in each of the blocks, on the other hand, a simplified pattern comparing circuit without the bit-error storage register 42 and the second adding circuit 44 may be used. That is, the comparator 45 may compare the number of bit errors output from the first adding circuit 40 with the allowable number of bit errors and outputs a pattern match flag for each of the storage patterns.

The pattern detecting circuit 18 will now be described. As shown in FIG. 1, the pattern detecting circuit 18 includes a pattern-comparison-result selecting circuit 20, a pattern-comparison-result masking circuit 22, a pattern match counter 24, and a pattern-match determining circuit 26.

When a match with the specific pattern is initially detected, matches between the specific pattern and more than one of 32 storage patterns may be simultaneously detected. In this case, more than one pattern match flags may become "1". Therefore, if the pattern comparing circuit 16 detects matches between the specific pattern and more than one of 32 storage patterns, the pattern-comparison-result selecting circuit 20 selects one of the matched storage patterns according to a predetermined rule. Then, the specific cycle and the specific bit for the second match are determined on the basis of the selected matched storage pattern.

For example, the pattern-comparison-result selecting circuit 20 selects one of the matched storage patterns that starts with a bit at the most front side in the serial data. That is, when a match with the specific pattern is initially detected, the pattern-comparison-result selecting circuit 20 selects only a pattern match flag for one of the matched storage patterns that starts with a bit at the most front side in the serial data. Then, after a certain number of cycles, the pattern-comparison-result selecting circuit 20 selects only a pattern match flag for specific one of the storage patterns to be subsequently matched.

Figure 11A:
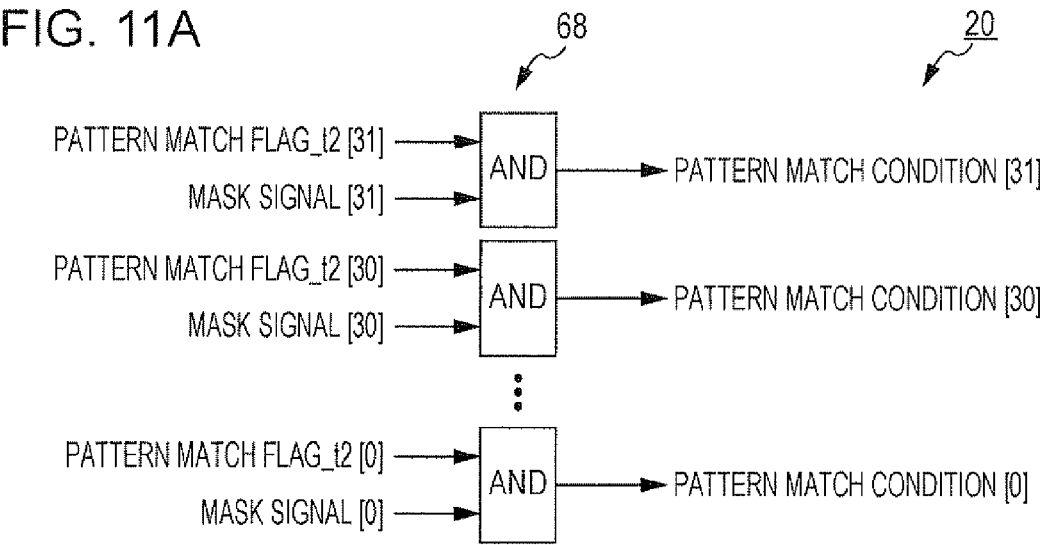
FIG. 11(A), FIG. 11(B), and FIG. 11(C) show an exemplary circuit diagram of a pattern-comparison-result selecting circuit.
Figure 11B:
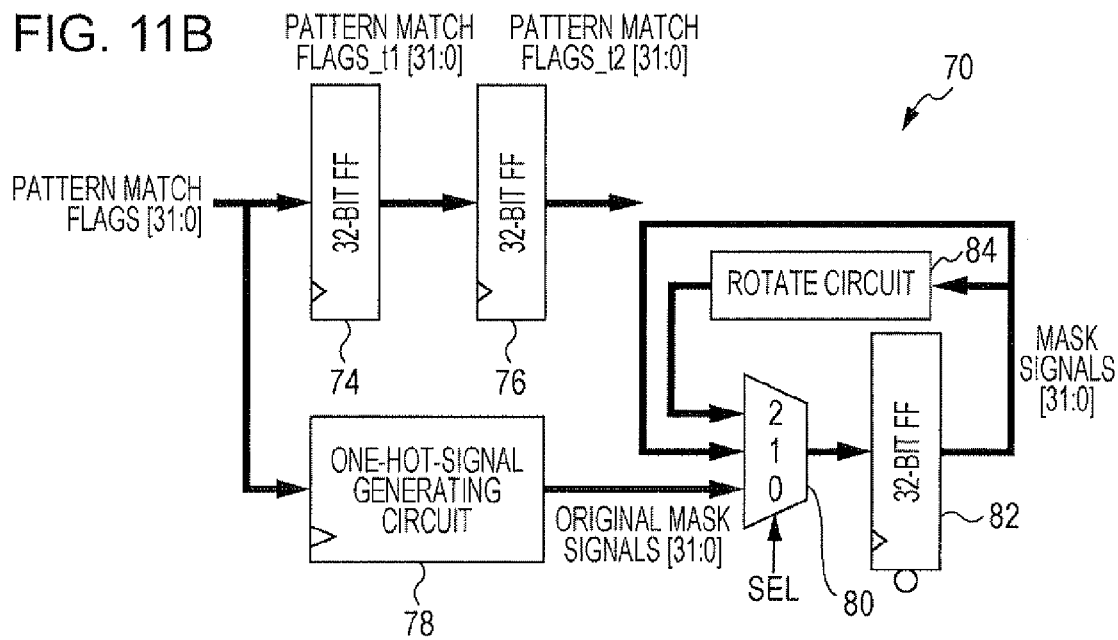
Figure 11C:
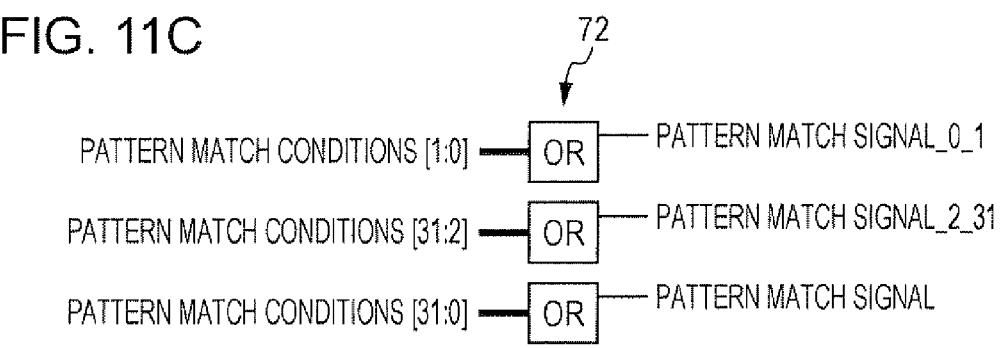

FIG. 11(A), FIG. 11(B), and FIG. 11(C) are circuit diagrams showing a configuration of an exemplary pattern-comparison-result selecting circuit. The exemplary pattern-comparison-result selecting circuit 20 includes 32 AND circuits 68, a mask-signal generating circuit 70, and three OR circuits 72.

As shown in FIG. 11(A), corresponding bits of pattern match flags_t2 [31:0] and mask signals [31:0] are input to respective AND circuits 68, which output pattern match conditions [31:0] for the corresponding bits. As described below, the pattern match flags_t2 [31:0] are generated by synchronizing the pattern match flags [31:0] with the mask signals [31:0]. If one of the mask signals [31:0] becomes "1", a corresponding pattern match flag_t2 [n] whose value is "1" is selected by the corresponding AND circuit 68 and only the corresponding pattern match condition [n] becomes "1". All the other pattern match conditions become "0".

The mask-signal generating circuit 70 generates mask signals [31:0] from the pattern match flags [31:0]. FIG. 11(B) shows a circuit that generates pattern match flags_t2 [31:0] from the pattern match flags [31:0]. As shown in FIG. 11(B), the mask-signal generating circuit 70 includes two 32-bit FFs 74 and 76 connected in series, a one-hot-signal generating circuit 78, a multiplexer 80, a 32-bit FF 82, and a rotate circuit 84.

The two FFs 74 and 76 connected in series delay the pattern match flags [31:0] output from the pattern comparing circuit 16 by a period of two parallel clock cycles, which is necessary for generating the mask signals [31:0]. The FF 74 outputs pattern match flags_t1 [31:0] generated by delaying the pattern match flags [31:0] by one cycle. The FF 76 outputs the pattern match flags_t2 [31:0] generated by delaying the pattern match flags [31:0] by two cycles. Thus, the pattern match flags [31:0] are synchronized with the mask signals [31:0].

The one-hot-signal generating circuit 78 receives the pattern match flags [31:0] and generates original mask signals [31:0]. Specifically, among the bits of the pattern match flags [31:0] having values of "1", the one-hot-signal generating circuit 78 only keeps one of the bits corresponding to one of the storage patterns that starts with a bit at the most front side in the serial data to "1". The one-hot-signal generating circuit 78 sets the other bits of the pattern match flags [31:0] to "0".

That is, in the exemplary embodiment, the one-hot-signal generating circuit 78 keeps a bit of the pattern match flags [31:0] corresponding to the largest matched storage pattern #n to "1", and sets the other bits of the pattern match flags to "0". Then, the one-hot-signal generating circuit 78 outputs the flags as the original mask signals [31:0] in synchronization with the parallel clock.

For example, if pattern match flag [31] is "1", the one-hot-signal generating circuit 78 sets the original mask signal [31] to "1" and sets all the other original mask signals [30:0] to "0". If pattern match flags [31:n+1] are all "0" and pattern match flag [n] is "1", the one-hot-signal generating circuit 78 sets the original mask signal [n] to "1" and sets all the other original mask signals to "0". If all pattern match flags [31:0] are "0", the one-hot-signal generating circuit 78 sets all original mask signals [31:0] to "0".

The rotate circuit 84 rotates the mask signals [31:0] by two bits to lower-order bits. In other words, the rotate circuit 84 generates mask signals [1:0, 31:2] from the mask signals [31:0].

When selection signal SEL is "0", "1", or "2", the multiplexer 80 outputs the original mask signals [31:0] from the one-hot-signal generating circuit 78, the mask signals [31:0] output from the FF 82, and the signals generated by rotating the mask signals [31:0] by two bits from the rotate circuit 84, respectively. In synchronization with the parallel clock, the output signal of the multiplexer 80 is stored in the FF 82 and output as the mask signals [31:0]. That is, as the mask signals [31:0], the original mask signals [31:0] are output if the selection signal SEL is "0", the mask signals [31:0] are stored without change if the selection signal SEL is "1", and signals obtained by rotating the mask signals [31:0] by two bits to lower-order bits are output if the selection signal SEL is "2".

As shown in FIG. 11(C), the OR circuit 72 on the upper side takes a logical sum of pattern match conditions [1:0] and outputs a pattern match signal_0_1. The OR circuit 72 in the middle takes a logical sum of pattern match conditions [31:2] and outputs a pattern match signal_2_31. The OR circuit 72 on the lower side takes a logical sum of all pattern match conditions [31:0] and outputs a pattern match signal. If either of the pattern match conditions [1:0] is "1", the pattern match signal_0_1 is "1". If any of the pattern match conditions [31:2] is "1", the pattern match signal_2_31 is "1". If any of the pattern match conditions [31:0] is "1", the pattern match signal is "1".

Figure 12:
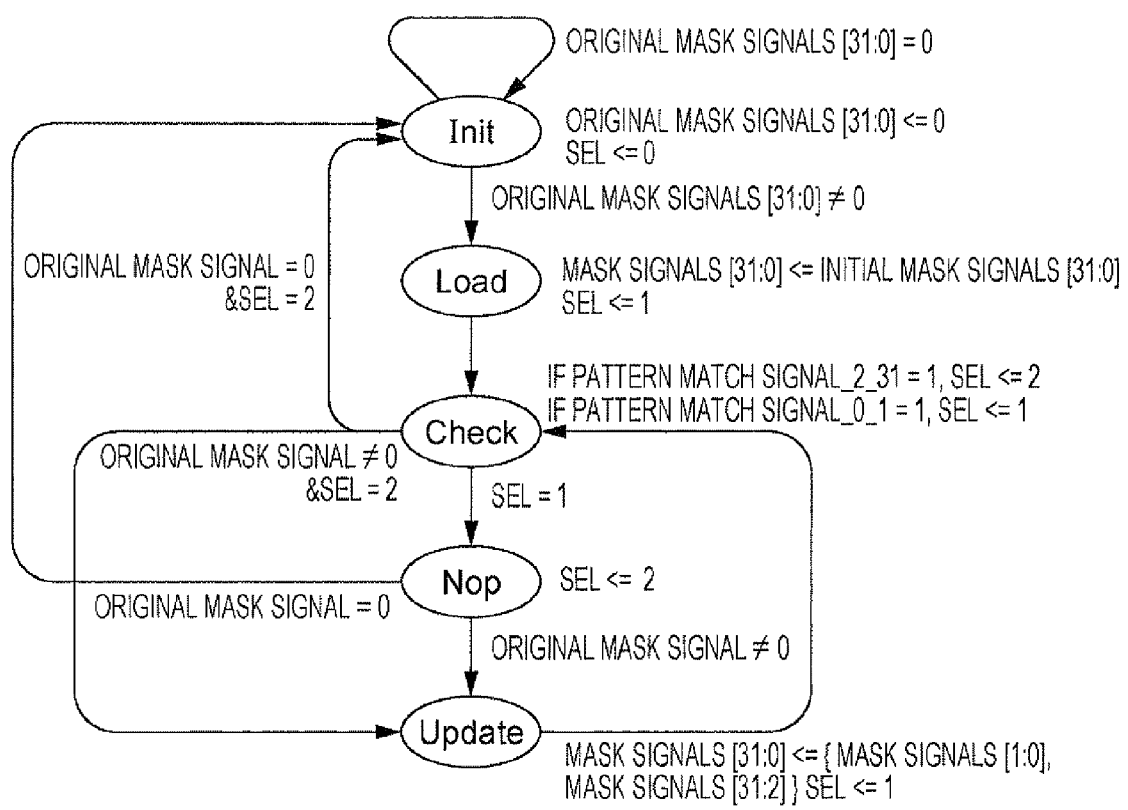
FIG. 12 shows an exemplary state diagram illustrating an operation of the pattern-comparison-result selecting circuit.

FIG. 12 is an exemplary state diagram that shows operation of the mask-signal generating circuit 70.

In initialization state (Init), the FF 82 of the mask-signal generating circuit 70 is reset and all mask signals [31:0] are initialized to "0". Thus, all pattern match conditions [31:0] become "0". As a result, the pattern match signal_0_1, the pattern match signal_2_31, and the pattern match signal also become "0". Furthermore, the selection signal SEL is set to "0".

Next, when a match with the specific pattern is initially detected (original mask signals [31:0]≠"0"), the process proceeds to mask signal loading state (Load). The one-hot-signal generating circuit 78 sets one of the bits of the original mask signals [31:0] to "1" in synchronization with the parallel clock. Because the selection signal SEL is "0", the original mask signals [31:0] from the one-hot-signal generating circuit 78 are output from the multiplexer 80 as an initial mask signals [31:0], stored in FF 82 in synchronization with the parallel clock, and output as the mask signals [31:0]. Then, the selection signal SEL is set to "1", and the mask signals [31:0] are held in the FF 82 without change.

When the mask signals [31:0] are updated, pattern match condition [n] output from the corresponding AND circuit 68 is "1" only when both the mask signal [n] and pattern match flag [n] are "1". Accordingly, only the pattern match condition [n] corresponding to the matched storage pattern #n that starts with a bit at the most front side in the serial data is "1".

Then, depending on the pattern match conditions [31:0], the OR circuits 72 output one of pattern match signal_0_1 and pattern match signal_2_31. The OR circuits 72 further outputs the pattern match signal.

Then, the process proceeds to pattern match signal checking state (Check).

If the pattern match signal_2_31="1", that is, if the match is detected in any of pattern match flags [31:2], the selection signal SEL is set to "2". In this case, a match with the specific pattern is to be subsequently detected after two cycles. When the pattern match signal_2_31="1" and a second match with the specific pattern is detected (original mask signals [31:0] ≠"0") after two cycles, the process proceeds to mask signal updating state (Update).

In the mask signal updating state, the output signal of the rotate circuit 84 is output from the multiplexer 80, and signals generated by shifting the mask signals [31:0] by two bits to lower-order bits are stored in the FF 82 in synchronization with the parallel clock. That is, when a first match is detected between the storage pattern #n and the specific pattern, mask signals [31:0] are updated such that only a mask signal #n−2, which corresponds to the storages pattern #n−2 to be subsequently matched with the specific pattern, is set to "1". Accordingly, only if a match is detected with the storage patterns #n−2 and corresponding one of the pattern match flag_t2 #n−2 becomes "1", the corresponding pattern match condition #n−2 becomes "1". Then, the OR circuit 72 sets the pattern match signal to "1".

Furthermore, the mask signals mask erroneous detections of matches with the other storage patterns. That is, even if a match or matches with storage patterns other than the storage pattern #n−2 are detected and corresponding pattern match flags_t2 are set to "1", none of the pattern match conditions [31:0] is set to "1", because all of the mask signals corresponding to the other storage patterns are "0". Accordingly, the pattern match signal is kept to "0".

Then, the selection signal SEL is set to "1" and the mask signals [31:0] are stored without change. The process returns to pattern match signal checking state and the above-described operations are repeated. On the other hand, if a match with the specific pattern is not detected after two cycles (original mask signals [31:0]="0"), the process returns to the initialization state and the above-described operations are repeated.

In the pattern match signal checking state, if the pattern match signal_0_1="1", that is, if the match is detected in either of pattern match flags [1:0], the selection signal SEL is set to "1". In this case, a match with the specific pattern is to be subsequently detected after three cycles.

When the pattern match signal_0_1="1" and a second match with the specific pattern is detected (original mask signals [31:0]≠"0") after three cycles including one cycle in no-operation state (Nop), the process proceeds to the mask signal updating state. Then, the above-described operations are repeated. On the other hand, if a match with the specific pattern is not detected after three cycles (original mask signals [31:0]="0"), the process returns to the initialization state and the above-described operations are repeated.

As explained above, when the pattern comparing circuit 16 shown in FIG. 1 detect a match or matches with the specific pattern, the OR circuit 72 of the pattern-comparison-result selecting circuit 20 sets the pattern match signal [31:0] to "1". Thereafter, however, the pattern-comparison-result masking circuit 22 masks the pattern match signal during a predetermined number of cycles before the cycle that the second match with the specific pattern is to be detected.

For example, the pattern-comparison-result masking circuit 22 receives the pattern match signal from the pattern-comparison-result selecting circuit 20 and generates masked pattern match signal to be supplied to the pattern match counter 24, which counts number of times the masked pattern match signal has successively become "1". The pattern-comparison-result masking circuit 22 may masks the pattern match signal, or set the masked pattern match signal to "0" even if the pattern match signal received from the pattern-comparison-result selecting circuit 20 is "1", during the predetermined number of cycles before the cycle that the second match is to be detected.

In the exemplary embodiment, the pattern-comparison-result masking circuit 22 masks the pattern match signal during two cycles when the pattern match signal_0_1="1", and masks the pattern match signal during one cycle when the pattern match signal_2_31="1". Thus, after pattern match signal of "1" that represents the first match with the specific pattern is supplied to the pattern match counter 24, pattern match signal of "1" is subsequently supplied to the pattern match counter 24 only if a match is detected during the specific cycle in which the second match with the specific pattern is to be detected.

Accordingly, even if the pattern-comparison-result selecting circuit 20 sets the pattern match signal to "1" before the cycle that the second match is to be detected, the pattern-comparison-result masking circuit 22 masks the erroneously generated pattern match signal. Furthermore, as explained above, the pattern-comparison-result selecting circuit 20 masks erroneous detections of matches with storage patterns other than the storage pattern to be subsequently matched. Accordingly, after pattern match signal of "1" that represents the first match is supplied to the pattern match counter 24, pattern match signal of "1" is subsequently supplied to the pattern match counter only if a match with the storage pattern, which is to be subsequently matched, is detected during the specific cycle during which the second match is to be detected.

As explained above, the pattern match counter 24 counts the number of times the pattern match signal has successively become "1". Thereby the pattern match counter 24 counts the number of blocks where a match with the specific pattern has been successively detected. In the exemplary embodiment, for example, the pattern match counter 24 is incremented by 1 if the masked pattern match signal becomes "1".". On the other hand, the pattern match counter 24 is reset to 0 if the pattern match signal that represents a result of comparison during the specific cycle in which the second match is to be detected becomes "0".

Lastly, when the number of pattern matches counted by the pattern match counter 24 reaches a predetermined number of times, the pattern-match determining circuit 26 determines that a predetermined number of contiguous blocks each having a bit pattern that matches the specific pattern have been detected.

Thus, the exemplary receiving apparatus 10 can detect reception of serial data that contains a predetermined number of contiguous blocks each having the specific pattern. Specifically, the exemplary receiving apparatus 10 can detect reception of serial data by taking into account the number of bit errors in a predetermined number of blocks, When a match with the specific pattern is initially detected, the exemplary receiving apparatus 10 specifies the conditions for detecting the second and subsequent matches. Accordingly, the exemplary receiving apparatus can correctly detect the second and subsequent matches, and correctly determine a number of successive detections of the specific pattern.

For example, the exemplary receiving apparatus can correctly detect the second and subsequent matches even if the numbers of cycles between the successive matches change. The exemplary receiving apparatus 10 does not erroneously determine that two successive matches have taken place even if an erroneous detection of the specific pattern caused by a noise and a correct detection of the specific pattern in the serial data occur within a short interval.

The exemplary receiving apparatus provides the bit-error storage register 42 for storing the number of bit errors contained in each of the blocks for a necessary number of clock cycles. Accordingly, calculation of a total number of bit errors in a plurality of blocks of specific patterns can be always realized as the sum of the values in the corresponding registers.

As a result, it is possible to correctly determine a total of successively detected numbers of bit errors. It is easy to expand the function of successively detecting the number of bit errors by simply increasing the number of serial connection of registers. Accordingly, it is possible to calculate the total number of bit errors in an increased number of blocks.

Note that, for example, M and N, a storage capacity of the received-pattern storage register 14, the specific range of N contiguous bits, the allowable number of bit errors, and the number of pattern matches to determine the reception of serial data, are not limited to specific values.

The exemplary receiving apparatus is capable of detecting a predetermined number of blocks of specific patterns in serial data. The specific pattern may have various lengths. The exemplary receiving apparatus may detect, for example, preamble and end of burst of serial data.

After detection of a storage pattern that matches the specific pattern, the exemplary pattern comparing circuit 16 may compare all storage patterns with the specific pattern, as in the exemplary embodiment described above. In this case, the pattern detecting circuit 18, or the pattern-comparison-result selecting circuit 20, may select only one of pattern match flags. That is, the pattern-comparison-result selecting circuit 20 masks erroneously generated pattern match flags that represent matches between the specific pattern and storage patterns other than the storage pattern to be subsequently matched.

Further, the pattern-comparison-result masking circuit 22 masks pattern match signals that represent matches during one or more cycles before the specific cycle in which the subsequent match is to be detected. That is, by masking the pattern match signals, the pattern-comparison-result masking circuit 22 effectively masks erroneously generated pattern match flags that represent matches during the cycles other than the specific cycle. Accordingly, the exemplary receiving apparatus can correctly detect subsequent matches.

Alternatively, the pattern comparing circuit 16 may compare the specific pattern with only one of the M-bit storage patterns that starts with a specific bit during the specific cycle. In this case, only one pattern match flag is set to "1" when the pattern comparing circuit 16 detects the subsequent match.

After detection of a first match between a storage pattern and the specific pattern during a first cycle, a subsequent match with the specific pattern is to be detected during a specific cycle. Accordingly, the pattern comparing circuit 16 may stop the comparing operation during cycles of the parallel clock after the first cycle and before the specific cycle. This can reduce power consumption.

In the exemplary embodiment described above, after detection of a storage pattern that matches the specific pattern, the storage pattern for the subsequent detection of match with the specific pattern is stored in the received-pattern storage register 14 after either two or three cycles. By adjusting the relationship between M and N, however, the number of cycles required to store the storage pattern for the subsequent match may be set to two cycles, or to other fixed numbers of cycles, for every state of pattern storage.

Further, even with the same values of M and N, it is also possible to set the cycles before the subsequent match to a fixed number for every state of pattern storage.

Figure 13:
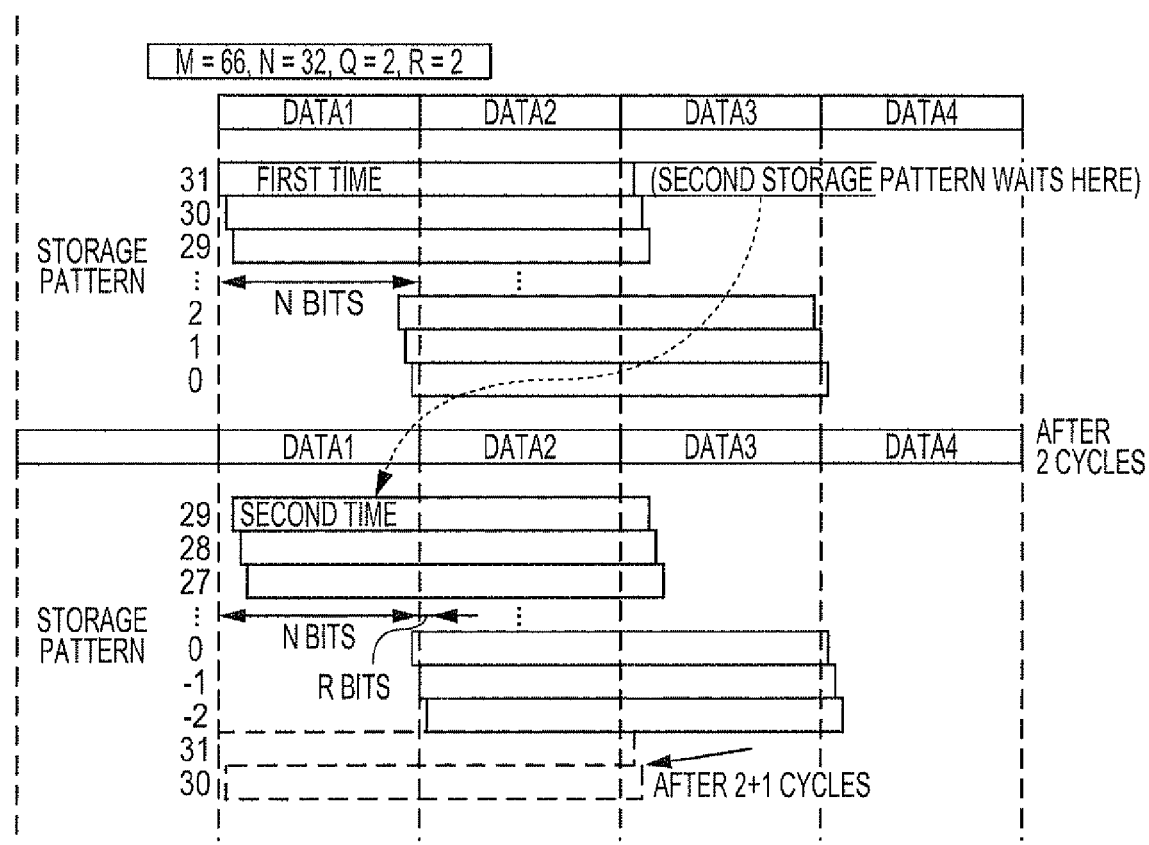
FIG. 13 shows an exemplary timing chart illustrating detections of a first and a second match between a specific pattern and storage patterns.

FIG. 13 conceptually illustrates how 66-bit specific patterns are stored when the first and second comparisons are performed in an exemplary case of, same as the exemplary embodiment described above, M=66, N=32, Q=2, and R=2.

In FIG. 13, DATA 1 to DATA 4 represent respective four 32-bit FFs of the received-pattern storage register 14. Same as the case shown in FIG. 4, a bit on the left side of the received-pattern storage register 14 in FIG. 13 corresponds to a bit at the front side of serial data. A storage pattern that starts with K-th bit from the front side of the range of N contiguous bits (32 contiguous bits) extending from the leftmost bit is defined as storage pattern #n (where #n=N−K−1=31−K).

In the first comparison, as shown on the upper side of FIG. 13, a 66-bit specific pattern may be stored in one of 32 storage patterns, 31 to 0. After the first match is detected in any of these storage patterns, the subsequent 66-bit specific pattern is stored after two cycles of the parallel clock as indicated by solid lines on the lower side of FIG. 13.

If, in the first comparison, the specific pattern has been stored in one of 30 storage patterns, 31 to 2, the specific pattern is stored in one of storage patterns 29 to 0 after two cycles of the parallel clock. In this case, the pattern comparing circuit 16 can detect the second match by using, among 32 comparators 38 prepared for detecting the first match, one of the comparators for detecting matches with storage patterns 29 to 0.

Thus, when the first specific pattern is stored in a storage pattern that starts with K-th bit from the front-side of the range of N contiguous bits, and K<N−R, the specific pattern can be subsequently detected after Q cycles by using a comparator for detecting a match with a storage pattern that starts with (K+R)-th bit from the front-side of the range of N contiguous bits.

However, if, in the first comparison, the specific pattern has been stored in one of two storage patterns 1 and 0, the specific pattern is stored after two cycles in storage patterns different from any of the storage patterns 31 to 0. That is, the specific pattern is stored in one of storage patterns −1 and −2 that start with the 32nd and 33rd bits, respectively, from the front-side of the range of N contiguous bits.

Therefore, the second match cannot be detected by any one of 32 comparators 38 of the pattern comparing circuit 16. In this case, the second match may be detected after one additional cycle, that is, after three cycles.

As indicated by broken lines at the bottom of FIG. 13, the specific pattern is stored in storage patterns 31 or 30 after three cycles. Accordingly, the second match can be detected by using, among 32 comparators 38 of the pattern comparing circuit 16, one of comparators for detecting matches with these storage patterns.

Thus, when the first specific pattern is stored in a storage pattern that starts with K-th bit from the front-side of the range of N contiguous bits (32 contiguous bits), and N−R≤K (K=30, 31), the specific pattern can be detected after Q+1 cycles by using a comparator provided for detecting a match with a storage pattern that starts with (K+R−N)-th bit from the front-side of the range of N contiguous bits.

Alternatively, the pattern comparing circuit 16 may be modified to include a total of 34 comparators including additional ones for detecting matches with storage patterns −1 and −2. Thereby, the second match can be detected after the same number of cycles, i.e., two cycles, from the detection of the first specific pattern even if the first match is detected in any of the 32 storage patterns.

That is, when the first specific pattern is stored in a storage pattern that starts with K-th bits from the front-side of the range of N contiguous bits (32 contiguous bits), and N−R≤K (K=30, 31), the second match can be detected after the same number of cycles, i.e., Q cycles, from the first detection by adding comparators for detecting matches with storage patterns that start with (K+R−N)-th bits (i.e., 0th and 1st bits) from a front-side of a range of R contiguous bits (i.e., 2 bits) immediately after the range of N contiguous bits.

Adding comparators increases the circuit size of the pattern comparing circuit 16. However, because the second match can be detected during the same cycle, it is possible to reduce the circuit size of the pattern detecting circuit 18. Further, a cost required for verifying an operation of the pattern detecting circuit 18 may be decreased.

Figure 14:
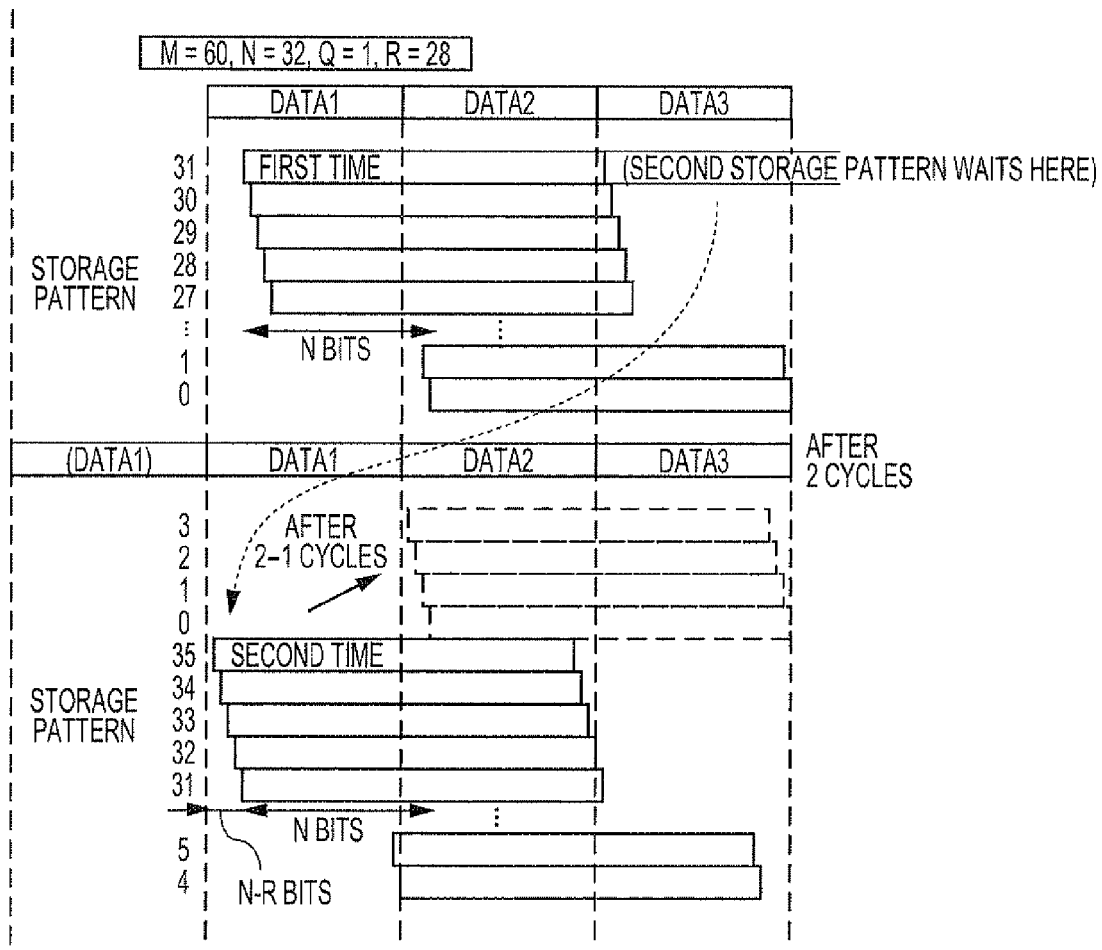
FIG. 14 shows another exemplary timing chart illustrating an operation of detecting a match between a specific pattern and each of storage patterns.

FIG. 14 conceptually illustrates how specific patterns are stored when the first and second comparisons are performed in another exemplary case of M=60, N=32, Q=1, and R=28.

In FIG. 14, DATA 1 to DATA 3 represent respective three 32-bit FFs of the received-pattern storage register 14. Same as the case shown in FIG. 4, a bit on the left side of the received-pattern storage register 14 in FIG. 14 corresponds to a bit at the front side of serial data. A storage pattern that starts with K-th bit from the front side of the range of N contiguous bits (32 contiguous bits) extending from the fifth bit from the left end is defined as storage pattern #n, where #n=N−K−1=31−K.

In the first comparison, as shown on the upper side of FIG. 14, a 60-bit specific pattern may be stored in one of 32 storage patterns, 31 to 0. After the first match is detected in any of these storage patterns, the subsequent 60-bit specific pattern is stored, after two cycles of the parallel clock, as indicated by solid lines on the lower side of FIG. 14.

If, in the first comparison, the specific pattern has been stored in one of 28 storage patterns, 27 to 0, the second specific pattern is stored in one of storage patterns 31 to 4. In this case, the pattern comparing circuit 16 can detect the second match by using, among 32 comparators 38 prepared for detecting the first match, one of comparators for detecting matched with storage patterns 31 to 4.

Thus, when the first specific pattern is stored in a storage pattern that starts with K-th bit from the front-side of the range of N contiguous bits, and N−R≤K, the second specific pattern can be detected after Q+1 cycles by using a comparator for detecting a match with a storage pattern that starts with (K+R−N)-th bit from the front-side of the range of N contiguous bits.

However, if, in the first comparison, the specific pattern has been stored in one of four storage patterns 31 to 28, the specific pattern is stored after two cycles in one of storage patterns different from any of the storage patterns 31 to 0. That is, the specific pattern is stored in one of storage patterns 35 to 32, which start with −4th to −1st bits from the front side of the range of N contiguous bits.

Therefore, the second match cannot be detected by any of the 32 comparators 38 of the pattern comparing circuit 16. In this case, the second match may be detected one cycle earlier, i.e., one cycle after the first detection. As indicated by broken lines in the middle of FIG. 14, because the specific pattern is stored in one of storage patterns 3 to 0 after one cycle, the second match can be detected by using, among 32 comparators 38 of the pattern comparing circuit 16, comparators for detecting matches with these storage patterns.

Thus, when the first specific pattern is stored in a storage pattern that starts with K-th bit from the front-side of the range of N contiguous bits (32 contiguous bits), and K<<N−R (K=0 to 3), the specific pattern can be detected after Q cycles by using a comparator for detecting a match with a storage pattern that starts with (K+R)-th bit from the front-side of the range of N contiguous bits.

Alternatively, the pattern comparing circuit 16 may be modified to include a total of 36 comparators including additional ones for detecting matches with storage patterns 35 to 32. Thereby, the second match can be detected after the same number of cycles, i.e., two cycles, from the detection of the first specific pattern even if the first match is detected in any of the 32 storage patterns.

That is, when the first specific pattern is stored in a storage pattern that starts with K-th bits from the front side of the range of N contiguous bits (32 contiguous bits), and K<N−R (K=0 to 3), the second match can be detected after the same number of cycles, i.e., Q+1 cycles, from the first detection by adding comparators for detecting matches with storage patterns that start with K-th bits (i.e., 0th to 3rd bits) from a front side of a range of N−R contiguous bits (i.e., 4 bits) immediately before the range of N contiguous bits.

When comparators are added to perform the second match detection for all storage patterns after the same number of cycles, the second detection may be performed either Q or Q+1 cycles after the first detection. If R<N/2 is true, as in the example of FIG. 13, a smaller number of comparators need to be added to perform the second detection after Q cycles. Conversely, if R>N/2 is true, as in the example of FIG. 14, a smaller number of comparators need to be added to perform the second detection after Q+1 cycles.

When comparators are added to perform the second match, each of the stages of the bit-error storage register 42 may be constructed with a number of FFs corresponding to respective comparators. Thereby, the bit-error storage register 42 stores the numbers of bit errors in respective ones of the storage patterns that the comparators compare with the specific pattern.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A receiving apparatus that receives serial data, the apparatus comprising:
   a serial-parallel conversion circuit that arranges bits in the serial data in an order of receiving to generate N-bit wide parallel data;
   a register group including a first register that stores a word of the N-bit wide parallel data, and one or more second registers to which the word of the parallel data stored in the first register is sequentially shifted and stored in synchronization with a parallel clock;
   a comparing circuit that compares an M-bit known pattern with M-bit storage patterns each including M contiguous bits stored in the register group in the order of receiving, where N<M; and
   a detecting circuit, wherein
   the serial data includes a plurality of contiguous blocks each having the M-bit known pattern; and
   the detecting circuit detects that the receiving apparatus has received the serial data when
      the comparing circuit detects, during a first cycle of the parallel clock, a first match between the known pattern and a first one of the storage patterns that starts with K-th bit from a front side of a specific range of bits, which includes N contiguous bits stored in the register group in the order of receiving, where K=0 to N−1; and
      the comparing circuit further detects, during a specific cycle of the parallel clock determined by K, N, Q, and R, where Q is a quotient of M/N and R is a remainder of M/N, a second match between the known pattern and a second one of the storage patterns that starts with a specific bit determined by the specific range of bits and K, N, and R.

2. The receiving apparatus according to claim 1, wherein the comparing circuit compares the known pattern with only the second one of the storage patterns during the specific cycle.

3. The receiving apparatus according to claim 1, wherein the comparing circuit stops comparing during one or more cycles of the parallel clock after the first cycle and before the specific cycle.

4. The receiving apparatus according to claim 1, wherein the comparing circuit compares the known pattern with the storage patterns to determine numbers of unmatched bits in respective ones of the storage patterns; and
   the comparing circuit further includes:
      a first unmatched-bit-number register to store the numbers of unmatched bits in the respective ones of the storage patterns; and
      a second unmatched-bit-number register having at least one stage to which the numbers of unmatched bits stored in the first unmatched-bit-number register are shifted and stored in synchronization of the parallel clock.

5. The receiving apparatus according to claim 4, wherein the comparing circuit detects the first and the second match when a sum of i) the number of unmatched bits in the first one of the storage patterns during the first cycle of the parallel clock stored in the second unmatched-bit-number register and ii) the number of unmatched bits in the second one of the storage patterns during the specific cycle of the parallel clock stored in the first unmatched-bit-number register is less than an allowable number of bit errors.

6. The receiving apparatus according to claim 1, wherein when the comparing circuit detects, during the first cycle of the parallel clock, a multiple first match between the known pattern and two or more of the storage patterns that start with respective ones of bits within the specific range of bits, the detecting circuit selects one of the two or more of the storage patterns as the first one of the storage patterns according to a predetermined rule.

7. The receiving apparatus according to claim 1, wherein the comparing circuit outputs comparison results for respective ones of the storage patterns; and
the detecting circuit includes a selecting circuit that selects respective ones of the comparison results between the known pattern and second one of the storage patterns from the comparison results output from the comparing circuit so that the detecting circuit determines that the comparing circuit detects the second match based on the selected ones of the comparison results.

8. The receiving apparatus according to claim 7, wherein the detecting circuit further includes a masking circuit so that the detecting circuit determines that the comparing circuit detects the second match based on the selected ones of the comparison results after the masking circuit masks a portion of the comparison results that represent matches between the known pattern and the second one of the storage patterns during one or more cycles of the parallel clock after the first cycle and before the specific cycle.

9. A receiving apparatus that receives serial data, the apparatus comprising:
a serial-parallel conversion circuit that arranges bits in the serial data in an order of receiving to generate N-bit wide parallel data;
a register group including a first register that stores a word of the N-bit wide parallel data, and one or more second registers to which the word of the parallel data stored in the first register is sequentially shifted and stored in synchronization with a parallel clock;
a comparing circuit that compares an M-bit known pattern with M-bit storage patterns each including M contiguous bits stored in the register group in the order of receiving, where N<M; and
a detecting circuit, wherein
the serial data includes a plurality of contiguous blocks each having the M-bit known pattern; and
the detecting circuit detects that the receiving apparatus has received the serial data when
the comparing circuit detects a first match between the known pattern and a first one of the storage patterns that starts with K-th bit from a front side of a specific range of bits, which includes N contiguous bits stored in the register group in the order of receiving, where K=0 to N−1, during a first cycle of the parallel clock; and the comparing circuit further detects a second match:
(1A) between the known pattern and a second one of the storage patterns that starts with (K+R)-th bit from the front side of the specific range of bits during Q-th cycle after the first cycle of the parallel clock, where Q is a quotient of M/N and R is a remainder of M/N, when K<N−R; and
(2A) between the known pattern and a second one of the storage patterns that starts with (K+R−N)-th bit from the front side of the specific range of bits during (Q+1)-th cycle after the first cycle of the parallel clock when N−R<K.

10. The receiving apparatus according to claim 9, wherein the comparing circuit includes N comparators that compare the known pattern with the storage patterns that start with respective ones of the bits within the specific range of bits; and
(1A) the detecting circuit detects that the receiving apparatus has received the serial data when one of the comparators that compares the known pattern with one of the storage patterns that starts with (K+R)-th bit from the front side of the specific range of bits detects the second match during Q-th cycle after the first cycle of the parallel clock when K<N−R, and
(2A) the detecting circuit detects that the receiving apparatus has received the serial data when one of the comparators that compares the known pattern with one of the storage patterns that starts with (K+R−N)-th bit from the front side of the specific range of bits detects the second match during Q+1)-th cycle after the first cycle of the parallel clock when N−R<K.

11. The receiving apparatus according to claim 9, wherein the comparing circuit compares the known pattern with the storage patterns to determine numbers of unmatched bits in respective ones of the storage patterns; and
the comparing circuit further includes:
a first unmatched-bit-number register to store the numbers of unmatched bits in the respective ones of the storage patterns; and
a second unmatched-bit-number register having at least one stage to which the numbers of unmatched bits stored in the first unmatched-bit-number register are shifted and stored in synchronization of the parallel clock.

12. The receiving apparatus according to claim 9, wherein the comparing circuit outputs comparison results for respective ones of the storage patterns; and
the detecting circuit includes a selecting circuit that selects respective ones of the comparison results between the known pattern and the second one of the storage patterns from the comparison results output from the comparing circuit so that the detecting circuit determines that the comparing circuit detects the second match based on the selected ones of the comparison results.

13. The receiving apparatus according to claim 12, wherein the detecting circuit further includes a masking circuit so that the detecting circuit determines that the comparing circuit detects the second match based on the selected ones of the comparison results after the masking circuit masks a portion of the comparison results that represent matches between the known pattern and the second one of the storage patterns during one or more cycles of the parallel clock after the first cycle and before a specific cycle.

14. A receiving apparatus that receives serial data, the apparatus comprising:

a serial-parallel conversion circuit that arranges bits in the serial data in an order of receiving to generate N-bit wide parallel data;

a register group including a first register that stores a word of the N-bit wide parallel data, and one or more second registers to which the word of the parallel data stored in the first register is sequentially shifted and stored in synchronization with a parallel clock;

a comparing circuit that compares an M-bit known pattern with M-bit storage patterns each including M contiguous bits stored in the register group in the order of receiving, where N<M; and a detecting circuit, wherein the serial data includes a plurality of contiguous blocks each having the M-bit known pattern; and the detecting circuit detects that the receiving apparatus has received the serial data when the comparing circuit detects, during a first cycle of the parallel clock, a first match between the known pattern and a first one of the storage patterns that starts with K-th bit from a front side of a specific range of bits, which includes N contiguous bits stored in the register group in the order of receiving, where K=0 to N−1; and the comparing circuit further detects, during a specific cycle of one of Q-th cycle after the first cycle and (Q+1)-th cycle after the first cycle of the parallel clock, where Q is a quotient of M/N, a second match between the known pattern and a second one of the storage patterns that starts with a specific bit, and wherein when the specific cycle is Q-th cycle after the first cycle of the parallel clock, the specific bit is:

(1A) (K+R)-th bit from the front side of the specific range of bits, where R is a remainder of M/N, when K<N−R; and (2B) (K+R−N)-th bit from a front side of a second specific range of bits, which includes R contiguous bits stored in the register group in the order of receiving immediately after the specific range of bits, when N−R≤K; and when the specific cycle is (Q+1)-th cycle after the first cycle of the parallel clock, the specific bit is:

(1B) K-th bit from a front side of a third specific range of bits, which includes N−R contiguous bits stored in the register group in the order of receiving immediately before the specific range of bits, when K<N−R; and (2A) (K+R−N)-th bit from the front side of the specific range of bits when N−R≤K.

15. The receiving apparatus according to claim 14, wherein the specific cycle is Q-th cycle after the first cycle of the parallel clock;

the comparing circuit includes:

N first comparators that compare the known pattern with the storage patterns that start with respective ones of the bits within the specific range of bits, and R second comparators that compare the known pattern with the storage patterns that start with respective ones of the bits within the second specific range of bits; and the detecting circuit detects that the receiving apparatus has received the serial data when (1A) one of the N first comparators that compares the known pattern with one of the storage patterns that starts with (K+R)-th bit from the front side of the specified range of bits detects the second match during the specific cycle when K<N−R; and (2B) one of the second comparators that compares the known pattern with one of the storage patterns that starts with (K+R−N)-th bit from the front side of the second specific range of bits detects the second match during the specific cycle when N−R≤K.

16. The receiving apparatus according to claim 14, wherein the specific cycle is (Q+1)-th cycle after the first cycle of the parallel clock;

the comparing circuit includes:

N first comparators that compare the known pattern with the storage patterns that start with respective ones of the bits within the specific range of bits, and N−R third comparators that compare the known pattern with the storage patterns that start with respective ones of the bits within the third specific range of bits; and the detecting circuit detects that the receiving apparatus has received the serial data when (1B) one of the third comparators that compares the known pattern with one of the storage patterns that starts with K-th bit from the front side of the third specific range of bits detects the second match during the specific cycle when K<N−R; and (2A) one of the first comparators that compares the known pattern with one of the storage patterns that starts with (K+R−N)-th bit from the front side of the specific range of bits detects the second match during the specific cycle when N−R≤K.

17. The receiving apparatus according to claim 14, wherein the comparing circuit compares the known pattern with the storage patterns to determine numbers of unmatched bits in respective ones of the storage patterns; and the comparing circuit further includes:

a first unmatched-bit-number register to store the numbers of unmatched bits in the respective ones of the storage patterns; and a second unmatched-bit-number register having at least one stage to which the numbers of unmatched bits stored in the first unmatched-bit-number register are shifted and stored in synchronization of the parallel clock.

18. The receiving apparatus according to claim 14, wherein the comparing circuit outputs comparison results for respective ones of the storage patterns; and the detecting circuit includes a selecting circuit that selects respective ones of the comparison results between the known pattern and the second one of the storage patterns from the comparison results output from the comparing circuit so that the detecting circuit determines that the comparing circuit detects the second match based on the selected ones of the comparison results.

19. The receiving apparatus according to claim 18, wherein the detecting circuit further includes a masking circuit so that the detecting circuit determines that the comparing circuit detects the second match based on the selected ones of the comparison results after the masking circuit masks a portion of the comparison results that represent matches between the known pattern and the second one of the storage patterns during one or more cycles of the parallel clock after the first cycle and before the specific cycle.

20. A method of detecting reception of serial data that includes a plurality of contiguous blocks each having M-bit known pattern, the method comprising:

arranging bits in the serial data in an order of receiving to generate N-bit wide parallel data;

storing a word of the N-bit wide parallel data in a first register of a register group, and sequentially shifting and storing the word stored in the first register into one or more second registers of the register group in synchronization with a parallel clock;

comparing the M-bit known pattern with M-bit storage patterns each including M contiguous bits stored in the register group in the order of receiving, where N<M; and detecting the reception of the serial data when the comparing detects, during a first cycle of the parallel clock, a first match between the known pattern and a first one of the storage patterns that starts with K-th bit from a front side of a specific range of bits, which includes N contiguous bits stored in the register group in the order of receiving, where K=0 to N−1; and the comparing further detects, during a specific cycle of the parallel clock determined by K, N, Q, and R, where Q is a quotient of M/N and R is a remainder of M/N, a second match between the known pattern and a second one of the storage patterns that starts with a specific bit determined by the specific range of bits and K, N, and R.

21. The method according to claim 20, wherein the comparing compares the known pattern with only the second one of the storage patterns during the specific cycle.

22. The method according to claim 20, wherein
the comparing includes stopping the comparing during one or more cycles of the parallel clock after the first cycle and before the specific cycle.

23. The method according to claim 20, wherein
the comparing compares the known pattern with the storage patterns to determine numbers of unmatched bits in respective ones of the storage patterns; and
the comparing further includes:
storing the numbers of unmatched bits in the respective ones of the storage patterns in a first unmatched-bit-number register; and
shifting and storing the numbers of unmatched bits stored in the first unmatched-bit-number register into a second unmatched-bit-number register having at least one stage in synchronization of the parallel clock.

24. The method according to claim 20, wherein
the comparing detects the first and the second match when a sum of i) a number of unmatched bits in the first one of the storage patterns during the first cycle of the parallel clock stored in a second unmatched-bit-number register and ii) the number of unmatched bits in the second one of the storage patterns during the specific cycle of the parallel clock stored in a first unmatched-bit-number register is less than an allowable number of bit errors.

25. The method according to claim 20, wherein
the comparing of the M-bit known pattern with M-bit storage patterns generates comparison results for respective ones of the storage patterns; and
the detecting of the reception of the serial data includes selecting respective ones of the comparison results between the known pattern and the second one of the storage patterns from the comparison results and determining that the comparing detects the second match based on the selected ones of the comparison results.

26. The method according to claim 25, wherein
the detecting of the reception of the serial data further includes masking a portion of the comparison results that represent matches between the known pattern and the second one of the storage patterns during one or more cycles of the parallel clock after the first cycle and before the specific cycle before the determining.

27. A method of detecting reception of serial data that includes a plurality of contiguous blocks each having M-bit known pattern, the method comprising:

arranging bits in the serial data in an order of receiving to generate N-bit wide parallel data;

storing a word of the N-bit wide parallel data in a first register of a register group, and sequentially shifting and storing the word stored in the first register into one or more second registers of the register group in synchronization with a parallel clock;

comparing the M-bit known pattern with M-bit storage patterns each including M contiguous bits stored in the register group in the order of receiving, where N<M; and detecting the reception of the serial data when the comparing detects a first match between the known pattern and a first one of the storage patterns that starts with K-th bit from a front side of a specific range of bits, which includes N contiguous bits stored in the register group in the order of receiving, where K=0 to N−1, during a first cycle of the parallel clock; and the comparing further detects a second match:

(1A) between the known pattern and a second one of the storage patterns that starts with (K+R)-th bit from the front side of the specific range of bits during Q-th cycle after the first cycle of the parallel clock, where Q is a quotient of M/N and R is a remainder of M/N, when K<N−R; and (2A) between the known pattern and a second one of the storage patterns that starts with (K+R−N)-th bit from the front side of the specific range of bits during (Q+1)-th cycle after the first cycle of the parallel clock when N−R<K.

28. The method according to claim 27, wherein
the comparing compares the known pattern with the storage patterns to determine numbers of unmatched bits in respective ones of the storage patterns; and
the comparing further includes:
storing the numbers of unmatched bits in the respective ones of the storage patterns in a first unmatched-bit-number register; and
shifting and storing the numbers of unmatched bits stored in the first unmatched-bit-number register into a second unmatched-bit-number register having at least one stage in synchronization of the parallel clock.

29. The method according to claim 27, wherein
the comparing of the M-bit known pattern with M-bit storage patterns generates comparison results for respective ones of the storage patterns; and
the detecting of the reception of the serial data includes selecting respective ones of the comparison results between the known pattern and the second one of the storage patterns from the comparison results and determining that the comparing detects the second match based on the selected ones of the comparison results.

30. The method according to claim 29, wherein
the detecting of the reception of the serial data further includes masking a portion of the comparison results that represent matches between the known pattern and the second one of the storage patterns during one or more cycles of the parallel clock after the first cycle and before a specific cycle before the determining.

31. A method of detecting reception of serial data that includes a plurality of contiguous blocks each having M-bit known pattern, the method comprising:

arranging bits in the serial data in an order of receiving to generate N-bit wide parallel data;

storing a word of the N-bit wide parallel data in a first register of a register group, and sequentially shifting and storing the word stored in the first register into one or more second registers of the register group in synchronization with a parallel clock;

comparing the M-bit known pattern with M-bit storage patterns each including M contiguous bits stored in the register group in the order of receiving, where N<M; and detecting the reception of the serial data when the comparing detects, during a first cycle of the parallel clock, a first match between the known pattern and a first one of the storage patterns that starts with K-th bit from a front side of a specific range of bits, which includes N contiguous bits stored in the register group in the order of receiving, where K=0 to N−1; and the comparing further detects, during a specific cycle of one of Q-th cycle after the first cycle and (Q+1)-th cycle after the first cycle of the parallel clock, where Q is a quotient of M/N, a second match between the known pattern and a second one of the storage patterns that starts with a specific bit, and wherein when the specific cycle is Q-th cycle after the first cycle of the parallel clock, the specific bit is:
 (1A) (K+R)-th bit from the front side of the specific range of bits when K<N−R, where R is a remainder of M/N; and
 (2B) (K+R−N)-th bit from a front side of a second specific range of bits, which includes R contiguous bits stored in the register group in the order of receiving immediately after the specific range of bits, when N−R≤K; and when the specific cycle is (Q+1)-th cycle after the first cycle of the parallel clock, the specific bit is:
 (1B) K-th bit from a front side of a third specific range of bits, which includes N−R contiguous bits stored in the register group in the order of receiving immediately before the specific range of bits, when K<N−R; and
 (2A) (K+R−N)-th bit from the front side of the specific range of bits when N−R≤K.

32. The method according to claim 31, wherein the comparing compares the known pattern with the storage patterns to determine numbers of unmatched bits in respective ones of the storage patterns; and the comparing further includes:

storing the number of unmatched bits in the respective ones of the storage patterns in a first unmatched-bit-number register; and shifting and storing the number of unmatched bits stored in the first unmatched-bit-number register into a second unmatched-bit-number register having at least one stage in synchronization of the parallel clock.

33. The method according to claim 31, wherein the comparing of the M-bit known pattern with M-bit storage patterns generates comparison results for respective ones of the storage patterns; and the detecting of the reception of the serial data includes selecting respective ones of the comparison results between the known pattern and the second one of the storage patterns from the comparison results and determining that the comparing detects the second match based on the selected ones of the comparison results.

34. The method according to claim 33, wherein the detecting of the reception of the serial data further includes masking a portion of the comparison results that represent matches between the known pattern and the second one of the storage patterns during one or more cycles of the parallel clock after the first cycle and before the specific cycle before the determining.

* * * * *